US008654848B2

(12) United States Patent
Tian et al.

(10) Patent No.: US 8,654,848 B2
(45) Date of Patent: Feb. 18, 2014

(54) METHOD AND APPARATUS FOR SHOT DETECTION IN VIDEO STREAMING

(75) Inventors: Tao Tian, San Diego, CA (US); Gordon Kent Walker, Poway, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1481 days.

(21) Appl. No.: 11/538,421

(22) Filed: Oct. 3, 2006

(65) Prior Publication Data

US 2007/0160128 A1 Jul. 12, 2007

Related U.S. Application Data

(60) Provisional application No. 60/727,644, filed on Oct. 17, 2005.

(51) Int. Cl.
*H04N 7/12* (2006.01)

(52) U.S. Cl.
USPC ...................... 375/240.16; 348/700

(58) Field of Classification Search
USPC ...................... 375/240.16; 348/700
See application file for complete search history.

(56) References Cited

U.S. PATENT DOCUMENTS

| 5,289,276 A | 2/1994 | Siracusa et al. |
| 5,508,752 A | 4/1996 | Kim et al. |
| 5,565,920 A | 10/1996 | Lee et al. |
| 5,598,428 A | 1/1997 | Sato |
| 5,619,272 A | 4/1997 | Salmon et al. |
| 5,642,294 A * | 6/1997 | Taniguchi et al. ............ 348/700 |
| 5,642,460 A | 6/1997 | Shimoda |
| 5,654,805 A | 8/1997 | Boon |

(Continued)

FOREIGN PATENT DOCUMENTS

| CL | 01332005 | 10/2005 |
| CL | 10432005 | 12/2005 |

(Continued)

OTHER PUBLICATIONS

Wiegand, T. et al., "Draft ITU-R reccommendation and final draft international standard of Joint Video Specification" Joint Video Team (JVT) of ISO-IEC MPEG & ITU-T VCEG. 8th Meeting: Geneva, Switzerland. May 27, 2003.

(Continued)

*Primary Examiner* — Mehrdad Dastouri
*Assistant Examiner* — Mohammed Rahaman
(74) *Attorney, Agent, or Firm* — Fulbright & Jaworski LLP

(57) ABSTRACT

The invention comprises devices and methods for processing multimedia data. Such methods can include obtaining at least one metric indicative of a difference for a selected frame and adjacent frames in a plurality of video frames, the metric comprising bi-directional motion information and luminance difference information, determining a shot event in the selected frame based on the at least one metric, and adaptively encoding the selected frame based on the shot event. An apparatus for processing a multimedia data can include a motion compensator configured to obtain metrics indicative of a difference between adjacent frames of a plurality of video frames, said metrics comprising bi-directional motion information and luminance information, a shot classifier configured to determine a shot event in the plurality of video frames based on said metrics, and an encoder configured to adaptively encode the plurality of frames based on the shot event.

36 Claims, 14 Drawing Sheets

(56) References Cited

U.S. PATENT DOCUMENTS

| | | | |
|---|---|---|---|
| 5,682,204 A | 10/1997 | Uz et al. | |
| 5,684,917 A | 11/1997 | Yanagihara et al. | |
| 5,686,962 A | 11/1997 | Chung et al. | |
| 5,699,119 A | 12/1997 | Chung et al. | |
| 5,745,645 A | 4/1998 | Nakamura et al. | |
| 5,754,233 A * | 5/1998 | Takashima | 348/390.1 |
| 5,771,357 A | 6/1998 | Kato et al. | |
| 5,790,179 A | 8/1998 | Shibata et al. | |
| 5,793,895 A | 8/1998 | Chang et al. | |
| 5,801,765 A * | 9/1998 | Gotoh et al. | 348/155 |
| 5,821,991 A | 10/1998 | Kwok | |
| 5,835,163 A | 11/1998 | Liou et al. | |
| 5,841,939 A | 11/1998 | Takahashi et al. | |
| 5,864,369 A | 1/1999 | Swan | |
| 5,960,148 A | 9/1999 | Miyazawa | |
| 5,978,029 A | 11/1999 | Boice et al. | |
| 5,991,502 A | 11/1999 | Kawakami et al. | |
| 6,012,091 A | 1/2000 | Boyce | |
| 6,014,493 A | 1/2000 | Shimoda | |
| 6,064,796 A | 5/2000 | Nakamura et al. | |
| 6,091,460 A | 7/2000 | Hatano et al. | |
| 6,157,674 A | 12/2000 | Oda et al. | |
| 6,175,593 B1 | 1/2001 | Kim et al. | |
| 6,317,518 B1 | 11/2001 | Enari | |
| 6,333,950 B1 | 12/2001 | Karasawa | |
| 6,363,114 B1 | 3/2002 | Kato | |
| 6,370,672 B1 | 4/2002 | Rick et al. | |
| 6,449,002 B1 | 9/2002 | Markman et al. | |
| 6,473,459 B1 * | 10/2002 | Sugano et al. | 375/240.16 |
| 6,490,320 B1 | 12/2002 | Vetro et al. | |
| 6,501,796 B1 | 12/2002 | Dusseux et al. | |
| 6,507,618 B1 | 1/2003 | Wee et al. | |
| 6,538,688 B1 | 3/2003 | Giles | |
| 6,539,220 B1 | 3/2003 | Sakai et al. | |
| 6,553,068 B1 | 4/2003 | Wake et al. | |
| 6,574,211 B2 | 6/2003 | Padovani et al. | |
| 6,580,829 B1 * | 6/2003 | Hurst et al. | 382/236 |
| 6,600,836 B1 | 7/2003 | Thyagarajan et al. | |
| 6,718,121 B1 | 4/2004 | Shikunami | |
| 6,721,492 B1 | 4/2004 | Togashi | |
| 6,724,819 B1 | 4/2004 | Takaki et al. | |
| 6,744,474 B2 | 6/2004 | Markman | |
| 6,773,437 B2 | 8/2004 | Ogilvie et al. | |
| 6,784,942 B2 | 8/2004 | Selby et al. | |
| 6,791,602 B1 | 9/2004 | Sasaki et al. | |
| 6,798,834 B1 | 9/2004 | Murakami et al. | |
| 6,891,891 B2 | 5/2005 | Pau et al. | |
| 6,900,846 B2 | 5/2005 | Lee et al. | |
| 6,904,081 B2 | 6/2005 | Frank | |
| 6,909,745 B1 | 6/2005 | Puri et al. | |
| 6,928,151 B2 | 8/2005 | Yamada et al. | |
| 6,934,335 B2 | 8/2005 | Liu et al. | |
| 6,959,044 B1 * | 10/2005 | Jin et al. | 375/240.12 |
| 6,970,506 B2 | 11/2005 | Kim et al. | |
| 6,985,635 B2 | 1/2006 | Chen et al. | |
| 6,987,728 B2 | 1/2006 | Deshpande | |
| 6,996,186 B2 | 2/2006 | Ngai et al. | |
| 7,009,656 B2 | 3/2006 | Thomson et al. | |
| 7,027,512 B2 | 4/2006 | Jeon | |
| 7,039,855 B2 | 5/2006 | Nikitin et al. | |
| 7,042,512 B2 | 5/2006 | Yang et al. | |
| 7,075,581 B1 | 7/2006 | Ozgen et al. | |
| 7,089,313 B2 | 8/2006 | Lee et al. | |
| 7,093,028 B1 | 8/2006 | Shao et al. | |
| 7,095,874 B2 | 8/2006 | Moskowitz et al. | |
| 7,123,816 B2 | 10/2006 | McGrath et al. | |
| 7,129,990 B2 | 10/2006 | Wredenhagen et al. | |
| 7,136,417 B2 | 11/2006 | Rodriguez | |
| 7,139,551 B2 | 11/2006 | Jamadagni | |
| 7,142,599 B2 | 11/2006 | Henocq | |
| 7,154,555 B2 | 12/2006 | Conklin | |
| 7,167,507 B2 | 1/2007 | Mailaender et al. | |
| 7,203,236 B2 | 4/2007 | Yamada | |
| 7,280,708 B2 | 10/2007 | Song et al. | |
| 7,356,073 B2 | 4/2008 | Heikkila | |
| 7,359,466 B2 | 4/2008 | Huang et al. | |
| 7,430,336 B2 | 9/2008 | Raveendran | |
| 7,433,982 B2 | 10/2008 | Peev et al. | |
| 7,443,448 B2 | 10/2008 | Yang et al. | |
| 7,474,701 B2 | 1/2009 | Boice et al. | |
| 7,479,978 B2 | 1/2009 | Cho et al. | |
| 7,483,581 B2 | 1/2009 | Raveendran et al. | |
| 7,486,736 B2 | 2/2009 | Zhidkov | |
| 7,528,887 B2 | 5/2009 | Wyman | |
| 7,536,626 B2 | 5/2009 | Sutivong et al. | |
| 7,634,260 B2 | 12/2009 | Chun | |
| 7,660,987 B2 | 2/2010 | Baylis et al. | |
| 7,676,106 B2 | 3/2010 | Panusopone et al. | |
| 7,705,913 B2 | 4/2010 | Jia et al. | |
| 7,738,716 B2 | 6/2010 | Song | |
| 7,840,112 B2 | 11/2010 | Rao | |
| 8,060,720 B2 | 11/2011 | Uppala | |
| 2001/0001614 A1 | 5/2001 | Boice et al. | |
| 2001/0017888 A1 | 8/2001 | Bruls | |
| 2001/0055337 A1 | 12/2001 | Matsuzaki et al. | |
| 2002/0021485 A1 | 2/2002 | Pilossof | |
| 2002/0047936 A1 * | 4/2002 | Tojo | 348/700 |
| 2002/0054621 A1 | 5/2002 | Kyeong et al. | |
| 2002/0097791 A1 | 7/2002 | Hansen | |
| 2002/0146071 A1 * | 10/2002 | Liu et al. | 375/240.16 |
| 2002/0149703 A1 | 10/2002 | Adams et al. | |
| 2002/0150162 A1 | 10/2002 | Liu et al. | |
| 2002/0154705 A1 | 10/2002 | Walton et al. | |
| 2002/0163964 A1 | 11/2002 | Nichols | |
| 2003/0021485 A1 | 1/2003 | Raveendran et al. | |
| 2003/0142762 A1 | 7/2003 | Burke | |
| 2003/0219160 A1 | 11/2003 | Song et al. | |
| 2004/0013196 A1 | 1/2004 | Takagi et al. | |
| 2004/0045038 A1 | 3/2004 | Duff et al. | |
| 2004/0073901 A1 | 4/2004 | Imamatsu | |
| 2004/0125877 A1 * | 7/2004 | Chang et al. | 375/240.28 |
| 2004/0136566 A1 | 7/2004 | Cho et al. | |
| 2004/0190609 A1 | 9/2004 | Watanabe | |
| 2004/0192274 A1 | 9/2004 | Vuori | |
| 2004/0264790 A1 | 12/2004 | Song et al. | |
| 2005/0022178 A1 | 1/2005 | Ghafoor et al. | |
| 2005/0062885 A1 | 3/2005 | Kadono et al. | |
| 2005/0063500 A1 | 3/2005 | Li et al. | |
| 2005/0076057 A1 | 4/2005 | Sharma et al. | |
| 2005/0078750 A1 | 4/2005 | Shen et al. | |
| 2005/0081482 A1 | 4/2005 | Lembo | |
| 2005/0134735 A1 | 6/2005 | Swartz | |
| 2005/0168634 A1 | 8/2005 | Wyman et al. | |
| 2005/0168656 A1 | 8/2005 | Wyman et al. | |
| 2005/0185719 A1 | 8/2005 | Hannuksela | |
| 2005/0192878 A1 | 9/2005 | Minear et al. | |
| 2005/0195889 A1 | 9/2005 | Grant et al. | |
| 2005/0195899 A1 | 9/2005 | Han | |
| 2005/0201478 A1 | 9/2005 | Claussen et al. | |
| 2005/0222961 A1 | 10/2005 | Staib et al. | |
| 2005/0231635 A1 | 10/2005 | Lin | |
| 2005/0249282 A1 | 11/2005 | Landsiedel et al. | |
| 2005/0254692 A1 | 11/2005 | Caldwell | |
| 2005/0265461 A1 | 12/2005 | Raveendran | |
| 2006/0002340 A1 | 1/2006 | Criss et al. | |
| 2006/0023788 A1 | 2/2006 | Otsuka et al. | |
| 2006/0129646 A1 | 6/2006 | Rhee et al. | |
| 2006/0133514 A1 | 6/2006 | Walker | |
| 2006/0146934 A1 | 7/2006 | Caglar et al. | |
| 2006/0153294 A1 | 7/2006 | Wang et al. | |
| 2006/0159160 A1 | 7/2006 | Kim et al. | |
| 2006/0166739 A1 | 7/2006 | Lin | |
| 2006/0197879 A1 * | 9/2006 | Covell et al. | 348/700 |
| 2006/0210184 A1 | 9/2006 | Song et al. | |
| 2006/0215539 A1 | 9/2006 | Vrcelj et al. | |
| 2006/0215761 A1 | 9/2006 | Shi et al. | |
| 2006/0222078 A1 | 10/2006 | Raveendran | |
| 2006/0230162 A1 | 10/2006 | Chen et al. | |
| 2006/0233239 A1 | 10/2006 | Sethi et al. | |
| 2006/0239347 A1 * | 10/2006 | Koul | 375/240.12 |
| 2006/0244840 A1 | 11/2006 | Eshet et al. | |
| 2006/0282737 A1 | 12/2006 | Shi et al. | |
| 2007/0014354 A1 | 1/2007 | Murakami et al. | |
| 2007/0074266 A1 | 3/2007 | Raveendran et al. | |

(56) References Cited

U.S. PATENT DOCUMENTS

| | | |
|---|---|---|
| 2007/0081586 A1 | 4/2007 | Raveendran et al. |
| 2007/0081587 A1 | 4/2007 | Raveendran et al. |
| 2007/0081588 A1 | 4/2007 | Raveendran et al. |
| 2007/0097259 A1 | 5/2007 | MacInnis et al. |
| 2007/0124443 A1 | 5/2007 | Nanda et al. |
| 2007/0124459 A1 | 5/2007 | Kasama |
| 2007/0160142 A1 | 7/2007 | Abrams |
| 2007/0171280 A1 | 7/2007 | Tian et al. |
| 2007/0171972 A1 | 7/2007 | Tian et al. |
| 2007/0171986 A1 | 7/2007 | Hannuksela |
| 2007/0206117 A1 | 9/2007 | Tian et al. |
| 2007/0208557 A1 | 9/2007 | Li et al. |
| 2007/0252894 A1 | 11/2007 | Satou et al. |
| 2008/0151101 A1 | 6/2008 | Tian et al. |
| 2009/0074070 A1 | 3/2009 | Yin et al. |
| 2009/0092944 A1 | 4/2009 | Pirker |
| 2009/0122186 A1 | 5/2009 | Rodriguez et al. |
| 2009/0168880 A1 | 7/2009 | Jeon et al. |
| 2009/0244840 A1 | 10/2009 | Takawa et al. |
| 2010/0020886 A1 | 1/2010 | Raveendran et al. |
| 2010/0171814 A1 | 7/2010 | Routhier et al. |

FOREIGN PATENT DOCUMENTS

| | | |
|---|---|---|
| CL | 10452005 | 12/2005 |
| CL | 14732005 | 1/2006 |
| CL | 5422006 | 8/2006 |
| CL | 05432006 | 9/2006 |
| CL | 05392006 | 11/2006 |
| CL | 5402006 | 11/2006 |
| CL | 5442006 | 2/2007 |
| CL | 02052001 | 12/2008 |
| CN | 1328747 A | 12/2001 |
| CN | 1372769 | 10/2002 |
| CN | 1395800 A | 2/2003 |
| CN | 1436423 A | 8/2003 |
| CN | 1647540 A | 7/2005 |
| CN | 1669314 A | 9/2005 |
| EP | 0547460 A1 | 6/1993 |
| EP | 0644695 | 3/1995 |
| EP | 0690617 A2 | 1/1996 |
| EP | 0946054 A1 | 9/1999 |
| EP | 1005227 | 5/2000 |
| EP | 1022667 A2 | 7/2000 |
| EP | 1164792 A2 | 12/2001 |
| EP | 1168731 A1 | 1/2002 |
| EP | 1195992 A1 | 4/2002 |
| EP | 1209624 A1 | 5/2002 |
| EP | 1265373 A2 | 12/2002 |
| EP | 1505488 A1 | 2/2005 |
| EP | 1547016 A1 | 6/2005 |
| EP | 1615447 A1 | 1/2006 |
| EP | 1657835 A1 | 5/2006 |
| FR | 2646047 A1 | 10/1990 |
| JP | 3189292 A | 8/1991 |
| JP | 5064175 A | 3/1993 |
| JP | 7222145 A | 8/1995 |
| JP | H07203433 A | 8/1995 |
| JP | 7298272 A | 11/1995 |
| JP | 7312756 A | 11/1995 |
| JP | 8046969 A | 2/1996 |
| JP | 08102938 | 4/1996 |
| JP | 8130716 A | 5/1996 |
| JP | 08214210 | 8/1996 |
| JP | 8251594 A | 9/1996 |
| JP | 09018782 | 1/1997 |
| JP | H09503890 A | 4/1997 |
| JP | 09284770 | 10/1997 |
| JP | 10013826 A | 1/1998 |
| JP | 10302396 A | 11/1998 |
| JP | 10313463 A | 11/1998 |
| JP | H114260 A | 1/1999 |
| JP | 11243547 A | 9/1999 |
| JP | 11316843 A | 11/1999 |
| JP | 2000032474 A | 1/2000 |
| JP | 2000059774 A | 2/2000 |
| JP | 2000115778 | 4/2000 |
| JP | 2000209553 A | 7/2000 |
| JP | 2000295626 | 10/2000 |
| JP | 2000350217 A | 12/2000 |
| JP | 2001045494 A | 2/2001 |
| JP | 2001169251 A | 6/2001 |
| JP | 3189292 B2 | 7/2001 |
| JP | 2001204026 A | 7/2001 |
| JP | 2001251629 A | 9/2001 |
| JP | 2002010259 A | 1/2002 |
| JP | 2002051336 A | 2/2002 |
| JP | 2002077822 A | 3/2002 |
| JP | 2002125227 A | 4/2002 |
| JP | 2002252834 A | 9/2002 |
| JP | 2002543714 T | 12/2002 |
| JP | 2003037844 A | 2/2003 |
| JP | 2003110474 A | 4/2003 |
| JP | 2003111079 A | 4/2003 |
| JP | 2003209837 A | 7/2003 |
| JP | 2003209848 A | 7/2003 |
| JP | 2003224847 A | 8/2003 |
| JP | 2003319341 A | 11/2003 |
| JP | 2003348583 A | 12/2003 |
| JP | 2004023288 A | 1/2004 |
| JP | 2004140488 A | 5/2004 |
| JP | 2005123732 A | 5/2005 |
| JP | 2006074684 A | 3/2006 |
| JP | 2007520126 T | 7/2007 |
| JP | 2008500935 A | 1/2008 |
| KR | 1020010099660 | 11/2001 |
| KR | 20020010171 A | 2/2002 |
| KR | 20030029507 A | 4/2003 |
| KR | 100389893 B1 | 6/2003 |
| KR | 20030073254 A | 9/2003 |
| KR | 1020040046320 | 6/2004 |
| KR | 20050089721 A | 9/2005 |
| KR | 20060011281 A | 2/2006 |
| TW | 536918 B | 6/2003 |
| WO | WO9535628 A1 | 12/1995 |
| WO | WO97/39577 | 10/1997 |
| WO | 9932993 A1 | 7/1999 |
| WO | WO9943157 | 8/1999 |
| WO | 0019726 | 4/2000 |
| WO | WO0067486 A1 | 11/2000 |
| WO | WO0156298 | 8/2001 |
| WO | 0166936 A1 | 9/2001 |
| WO | WO0169936 | 9/2001 |
| WO | 0178389 A1 | 10/2001 |
| WO | WO0178398 A1 | 10/2001 |
| WO | WO0225925 | 3/2002 |
| WO | WO0243398 | 5/2002 |
| WO | WO02087255 | 10/2002 |
| WO | 03052695 A2 | 6/2003 |
| WO | WO2004008747 A2 | 1/2004 |
| WO | WO2004008757 A1 | 1/2004 |
| WO | WO2004019273 | 3/2004 |
| WO | WO2004049722 A1 | 6/2004 |
| WO | WO2004054270 | 6/2004 |
| WO | WO2004057460 A2 | 7/2004 |
| WO | WO2004070953 A2 | 8/2004 |
| WO | WO2004114667 A1 | 12/2004 |
| WO | WO2004114672 | 12/2004 |
| WO | WO2005006764 A1 | 1/2005 |
| WO | WO2005069917 | 8/2005 |
| WO | WO2005074147 A1 | 8/2005 |
| WO | WO2005081482 A1 | 9/2005 |
| WO | WO2005107266 | 11/2005 |
| WO | WO2005109900 | 11/2005 |
| WO | 2006099082 A2 | 9/2006 |
| WO | WO2006099242 | 9/2006 |
| WO | WO2007047755 | 4/2007 |

OTHER PUBLICATIONS

Lee, J. "A fast frame type selection technique for very low bit rate coding using MPEG-1," Real-Time Imaging, Academic Press Limited, GB, vol. 5, No. 2, Apr. 1999, pp. 83-94.

(56) References Cited

OTHER PUBLICATIONS

MPEG Digital Video-Coding Standards, IEEE Signal Processing Magazine, IEEE Service Center, Piscataway, NJ, vol. 14, No. 5, Sep. 1997, pp. 82-100, XP011089789.
R4-030797, An Advanced Receiver Proposal for MIMO, TSG-RAN WG4 #28, Lucent Technologies, Sophia-Antipolis, Aug. 18-22, 2003, pp. 1-8.
SMPTE RP 273-1989 SMPTE Recommended Practice Specifications for Safe Action and Safe Title Areas Test Pattern for Television Systems Society of Motion Picture and Television Engineers, pp. 1-3 Approved Mar. 29, 1989.
Donoho D. L., et al., "Ideal spatial adaptation by wavelet shrinkage," Biometrika, 1994, 8, 1-30.
Ghael S.P., et al., "Improved Wavelet dertoising via empirical Wiener filtering," Proceedings of SPIE, 1997, 3169, 1-11.
Girod, et al., "Scalable codec architectures for Internet video-on-demand, Signals, Systems & Computers, CA, USA Nov. 2-5, 1997, Los Alamitos, CA, USA, IEEE Comput Soc US vo," Conference Record of the Thirty-First Asilomar Conference of Pacific Grove, 1997.
Haan G. D., et al., "De-interlacing of video data," IEEE Transactions on Consumer Electronics, 1997, 43 (3), 1-7.
Haavisto P., et al., "Scan rate up-conversions using adaptive weighted median filtering" Signal Processing of HDTV II, 1990, Elsevier Science Publishers, 703-710.
Jung K., et al., "Deinterlacing using Edge based Motion Estimation," IEEE MWSCS, 1995, 892-895.
Kwon, et al., "Overview of H264/MPEG-4 part 10, Inc, XP005312621," Journal of visual Communication and Image Representation, 2006, 17 (2), Academic Press, 186-216.
Liang Y., et al., "A new content-based hybrid video transcoding method Oct. 7-10, 2001," 2001 International Conference on Image Processing, 2001, 4, 429-432.
Mihaela Van Der Schaar, et al., "A Hybrid Temporal-SNR Fine-Granular Scalability for Internet Video, IEEE Service Center, XP011014178," IEEE Transactions on Circuits and Systems for Video Technology, 2001, 11 (3).
Rusert, et al., "Enhanced interference wavelet video coding considering the interrelation of spatio-temporal transform and motion compensation,Aug. 2004, XP00004524456," Signal Processing, Image Communication, 2004, 19 (7), Elsevier Science Publishers, 617-635.
Simonetti R., et al., "Deinterlacing of HDTV Images for Multimedia Applications," Signal Processing of HDTV IV, 1993, Elsevier Science Publishers, 765-772.
Wang F. M., et al., "Time recursive Deinterlacing for IDTV and Pyramid Coding, Signal Processing," Image Communications 2, 1990, 1306-1309.
Puri et al, "Video coding using the H.264/MPEG-4 AVC compression standard" Signal Processing. Image Communication, Elsevier Science Publishers, Amsterdam, NL, vol. 19, No. 9, Oct. 1, 2004, pp. 793-849, XP004607150.
De Haan Gerard, et al., "Deinterlacing—An Overview," Proceeding of the IEEE, 1998, 86 (9), 1839-1857.
International Search Report—PCT/US2006/040712, International Search Authority—European Patent Office—Mar. 7, 2007.
International Preliminary Report on Patentability—PCT/US2006/040712, International Search Authority—The International Bureau of WIPO—Geneva, Switzerland—Apr. 23, 2008.
Written Opinion—PCT/US2006/040712, International Search Authority—European Patent Office—Mar. 7, 2007.
C. Huang et al.: "A Robust Scene-Change Detection method for Video Segmentation," IEEE Transactions on Circuits and Systems for Video Technology, vol. 11, No. 12, pp. 1281-1288, Dec. 2001.
S. Pei et al.: "Effective Wipe Detection in MPEG Compressed Video Using Macroblock Type Information," IEEE Transactions on Multimedia, vol. 4, No. 3, pp. 309-319, Sep. 2002.
S. Lee et al.: "Fast Scene Change Detection using Direct Feature Extraction from MPEG Compressed Videos," IEEE Transactions on Multimedia, vol. 2, No. 4, pp. 240-254, Dec. 2000.
D. Lelescu et al.: "Statistical Sequential Analysis for Real-Time Video Scene Change Detection on Compressed Multimedia Bitstream," IEEE Transactions on Multimedia, vol. 5, No. 1, pp. 106-117, Mar. 2003.
Boyce, Jill M.: "Packet loss resilient transmission of MPEG video over the Internet" Signal Processing: Image Communication, Elsevier Science Publishers, Amsterdam, NL, vol. 15, No. 1-2, Sep. 1999, pp. 7-24, XP004180635.
Translation of Office Action dated Jan. 28, 2011 in Taiwanese application 096110382.
3GPP2-C10-20040607-102, "Third Generation Partnership Project 2", TSG-C Working Group 1.2—Multimedia Services, Montreal, Quebec, Canada, May 17-20, 2004, Qualcomm.
Mailaender, L., et al., "Linear MIMO equalization for CDMA downlink signals with code reuse", Wireless Communications, IEEE Transactions on, Sep. 2005, vol. 4, Issue 5, pp. 2423-2434.

* cited by examiner

METHOD AND APPARATUS FOR SHOT DETECTION IN VIDEO STREAMING

The present Application for Patent claims priority to Provisional Application No. 60/727,644 entitled "METHOD AND APPARATUS FOR SHOT DETECTION IN VIDEO STREAMING" filed Oct. 17, 2005, and assigned to the assignee hereof and hereby expressly incorporated by reference herein.

BACKGROUND

1. Field

The invention generally is directed to multimedia data processing, and more particularly, to encoding multimedia data based on shot detection processing.

2. Background

Shot detection relates to determining when a frame in a group of pictures (GOP) exhibits data that indicates a scene change has occurred. Generally, within a GOP, the frames may have no significant changes in any two or three (or more) adjacent frames, or there may be slow changes, or fast changes. Of course, these scene change classifications can be further broken down to a greater level of changes depending on a specific application, if necessary.

Detecting shot or scene changes is important for efficient encoding of video. Typically, when a GOP is not changing significantly, an I-frame at the beginning of the GOP is followed by a number of predictive frames can sufficiently encode the video so that subsequent decoding and display of the video is visually acceptable. However, when a scene is changing, either abruptly or slowly, additional I-frames and less predictive encoding (P-frames and B-frames) may be used to produce subsequently decoded visually acceptable results. Improvements in shot detection and corresponding encoding using the results of shot detection could improve coding efficiency and overcome other problems in the art associated with GOP partitioning.

SUMMARY

Each of the inventive apparatuses and methods described herein has several aspects, no single one of which is solely responsible for its desirable attributes. Without limiting the scope of this invention, its more prominent features will now be discussed briefly. After considering this discussion, and particularly after reading the section entitled "Detailed Description" one will understand how the features of this invention provides improvements for multimedia data processing apparatuses and methods.

A method of processing multimedia data, the method comprising obtaining at least one metric indicative of a difference between a selected frame and frames temporally adjacent to the selected frame in a plurality of video frames, said at least one metric comprising bi-directional motion information and luminance difference information associated with the selected frame and the frames temporally adjacent to the selected frame, determining a shot event associated with the selected frame based on said at least one metric, and adaptively encoding the selected frame based on the shot event. In one aspect obtaining the at least one metric comprises calculating the at least one metric. If the shot event indicates that the selected frame is an abrupt scene change, the selected frame can be adaptively encoded as an I-frame. If the shot event indicates the selected frame is a portion of a plurality of frames comprising a slow scene change, the selected frame can be encoded as either a P-frame or a B-frame. In another aspect, if the shot event indicates that the selected frame contains at least one camera flashlight, the selected frame can be identified as requiring special processing. Examples of such special processing include removal of the selected frame from video, and replicating a frame temporally adjacent to the selected frame and substituting the replicated frame for the selected frame. In some aspects, the shot event indicates the selected frame comprises an abrupt scene change, a portion of a slow scene change, or at least one camera flashlight. In some aspects, adaptively encoding comprises encoding the selected frame as an I-frame if the shot event does not indicate the selected frame comprises abrupt scene change, a portion of a slow scene change, or at least one camera flashlight.

In another aspect, an apparatus for processing a multimedia data includes a motion compensator configured to obtain at least one metric indicative of a difference between a selected frame and frames temporally adjacent to the selected frame in a plurality of video frames, said at least one metric comprising bi-directional motion information and luminance information, a shot classifier configured to determine shot events associated with the selected frame based on said at least one metric, and an encoder configured to adaptively encode the selected frame based on the shot event.

In another aspect, an apparatus for processing multimedia data includes means for obtaining at least one metric indicative of a difference between a selected frame and frames temporally adjacent to the selected frame in a plurality of video frames, said at least one metric comprising bi-directional motion information and luminance difference information associated with the selected frame and the frames temporally adjacent to the selected frame, means for determining a shot event associated with the selected frame based on said at least one metric, and means for adaptively encoding the selected frame based on the shot event. If the shot event indicates that the selected frame is an abrupt scene change, and the adaptively encoding means can for encode the selected frame as an T-frame. In another aspect, where the shot event indicates the selected frame is portion of a plurality of frames comprising a slow scene change, and the adaptively encoding means can comprise means for encoding the selected frame as either a P-frame or a B-frame. In another aspect, the shot event indicates that the selected frame contains at least one camera flashlight, and the adaptively encoding means can include means for encoding the identifying the selected frame as requiring special processing.

In another aspect, a machine readable medium includes instructions for processing multimedia data, wherein the instructions upon execution cause a machine to obtain at least one metric indicative of a difference between a selected frame and frames temporally adjacent to the selected frame in a plurality of video frames, the at least one metric comprising bi-directional motion information and luminance difference information associated with the selected frame and the frames temporally adjacent to the selected frame, determine a shot event associated with the selected frame based on said at least one metric, and adaptively encode the selected frame based on the shot event.

In another aspect, a processor for processing multimedia data, the processor being configured comprising a configuration to obtain at least one metric indicative of a difference between a selected frame and frames temporally adjacent to the selected frame in a plurality of video frames, said at least one metric comprising bi-directional motion information and luminance difference information associated with the selected frame and the frames temporally adjacent to the selected frame, determine a shot event associated with the selected frame based on said at least one metric, and adaptively encode the selected frame based on the shot event.

DETAILED DESCRIPTION

In the following description, specific details are given to provide a thorough understanding of the aspects. However, it will be understood by one of ordinary skill in the art that the aspects may be practiced without these specific detail. For example, communication systems and video processing devices may be shown in block diagrams in order not to obscure the aspects in unnecessary detail.

Described herein are certain inventive aspects for shot detection and encoding systems and methods that improve the performance of existing encoding systems. Such aspects utilizes statistics (or metrics) that include statistical comparisons between adjacent frames of video data to determine if an abrupt scene change occurred, a scene is slowly changing, or if there are camera flashlights in the scene which can make video encoding especially complex. The statistics can be obtained from a preprocessor and then sent to an encoding device, or they can be generated in an encoding device (e.g., by a processor configured to perform motion compensation). The resulting statistics aid scene change detection decision. In a system that does transcoding, often a suitable preprocessor or configurable processor exists. If the preprocessor perform motion-compensation aided deinterlacing, the motion compensation statistics are available and ready to use.

A shot detector as described herein can utilize statistics from a previous frame, a current frame, and a next frame only so that the algorithm has very low latency. The shot detector differentiates several different types of shot events, including abrupt scene change, cross-fading and other slow scene change, and camera flashlight. By determining different type of shot events with different strategies in the encoder, the encoding efficiency and visual quality is enhanced.

References herein to "one aspect," "an aspect," some aspects," or "certain aspects" mean that one or more of a particular feature, structure, or characteristic described in connection with the aspect can be included in at least one aspect of a shot detection and encoding system. The appearances of such phrases in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

"Multimedia data" or "multimedia" as used herein is a broad term that includes video data (which can include audio data), audio data, or both video data and audio data. "Video data" or "video" as used herein as a broad term, which refers to an image or one or more series or sequences of images containing text, image, and/or audio data, and can be used to refer to multimedia data or the terms may be used interchangeably, unless otherwise specified.

Figure 1:
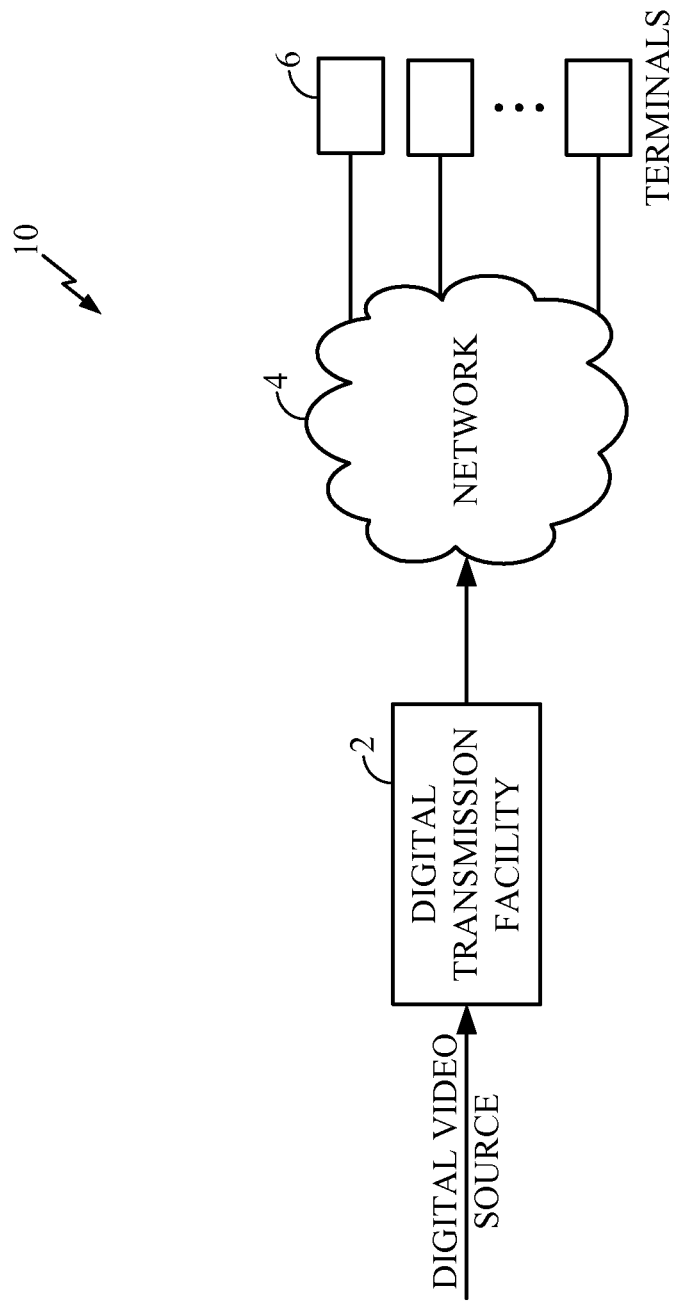
FIG. 1 is a block diagram of a communications system for delivering streaming multimedia data.

FIG. 1 is a block diagram of a communications system 10 for delivering streaming multimedia. Such system finds application in the transmission of digital compressed video to a multiplicity of terminals as shown in FIG. 1. A digital video source can be, for example, a digital cable or satellite feed or an analog source that is digitized. The video source is processed in a transmission facility 2 where it is encoded and modulated onto a carrier for transmission through a network 4 to one or more terminals 6. The terminals 6 decode the received video and typically display at least a portion the video. The network 4 refers to any type of communication network, wired or wireless, suitable for the transmission of encoded data. For example, the network 4 can be a cell phone network, wired or wireless local area network (LAN) or a wide area network (WAN), or the Internet. The terminals 6 can be any type of communication device capable of receiving and displaying data, including, but not limited to, cell phones, PDA's, in-home or commercial video display equipment, computers (portable, laptop, handheld, PC's, and larger server-based computer systems), and personal entertainment devices capable of using multimedia data.

Figure 2:
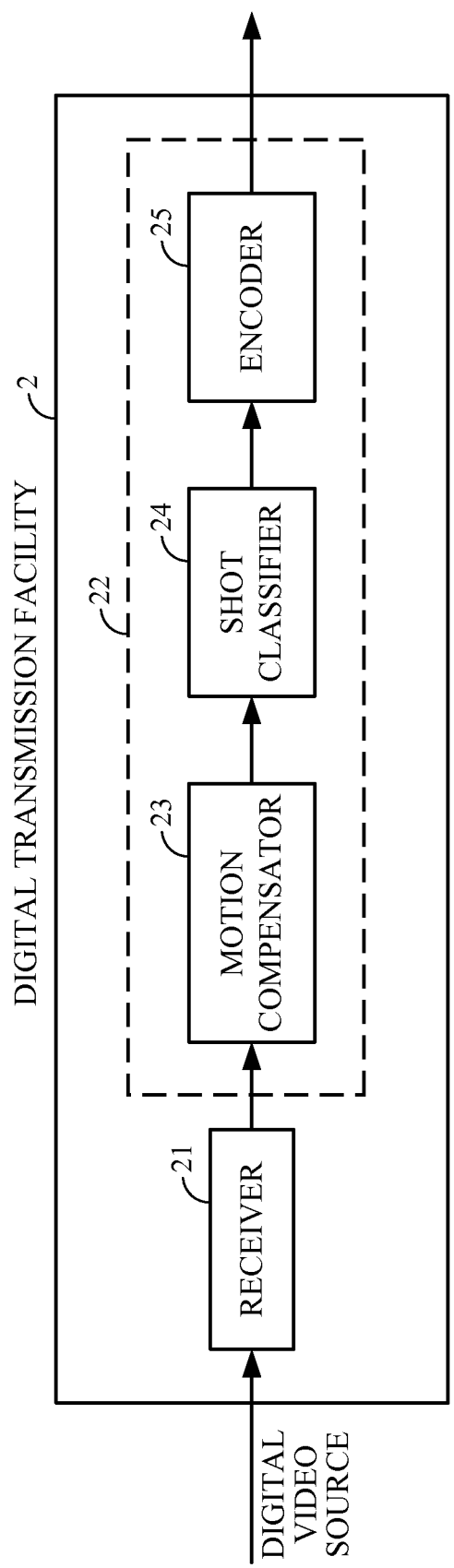
FIG. 2 is a block diagram of certain components of a digital transmission facility for encoding multimedia data.

FIG. 2 is a block diagram of certain components of a digital transmission facility for encoding multimedia data, according to some aspects. A receiver 21 in the digital transmission facility 2 receives a digital video source and provides the video to an encoding component (or apparatus) 22 for processing and encoding the video. Encoding component 22 includes a motion compensator 23, a shot classifier 24, and an encoder 25 for processing the video.

The motion compensator 23 can be configured to determine bi-directional motion information about frames in the video. The motion compensator 23 can also be configured to determine one or more difference metrics, for example, the sum of absolute differences (SAD) or the sum of absolute differences (SSD), and calculate other information including luminance information for one or more frames (e.g., macroblock (MB) luminance averages or differences), a luminance histogram difference, and a frame difference metric, examples of which are described in reference to Equations 1-3. The shot classifier can be configured to classify frames in the video into two or more categories of "shots" using information determined by the motion compensator. The encoder is configured to adaptively encode the plurality of frames based on the shot classifications. The motion compensator, shot classifier, and encoder are described below in reference to Equations 1-10.

The encoding component 22, components thereof, and processes contained therein, can be implemented by hardware, software, firmware, middleware, microcode, or any combination thereof. For example, the motion compensator 23, shot classifier 24, and the encoder 25 may be standalone components, incorporated as hardware, firmware, middleware in a component of another device, or be implemented in microcode or software that is executed on a processor, or a combination thereof. When implemented in software, firmware, middleware or microcode, the program code or code segments that perform the motion compensation, shot classifying and encoding processes may be stored in a machine readable medium such as a storage medium. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

Figure 3A:
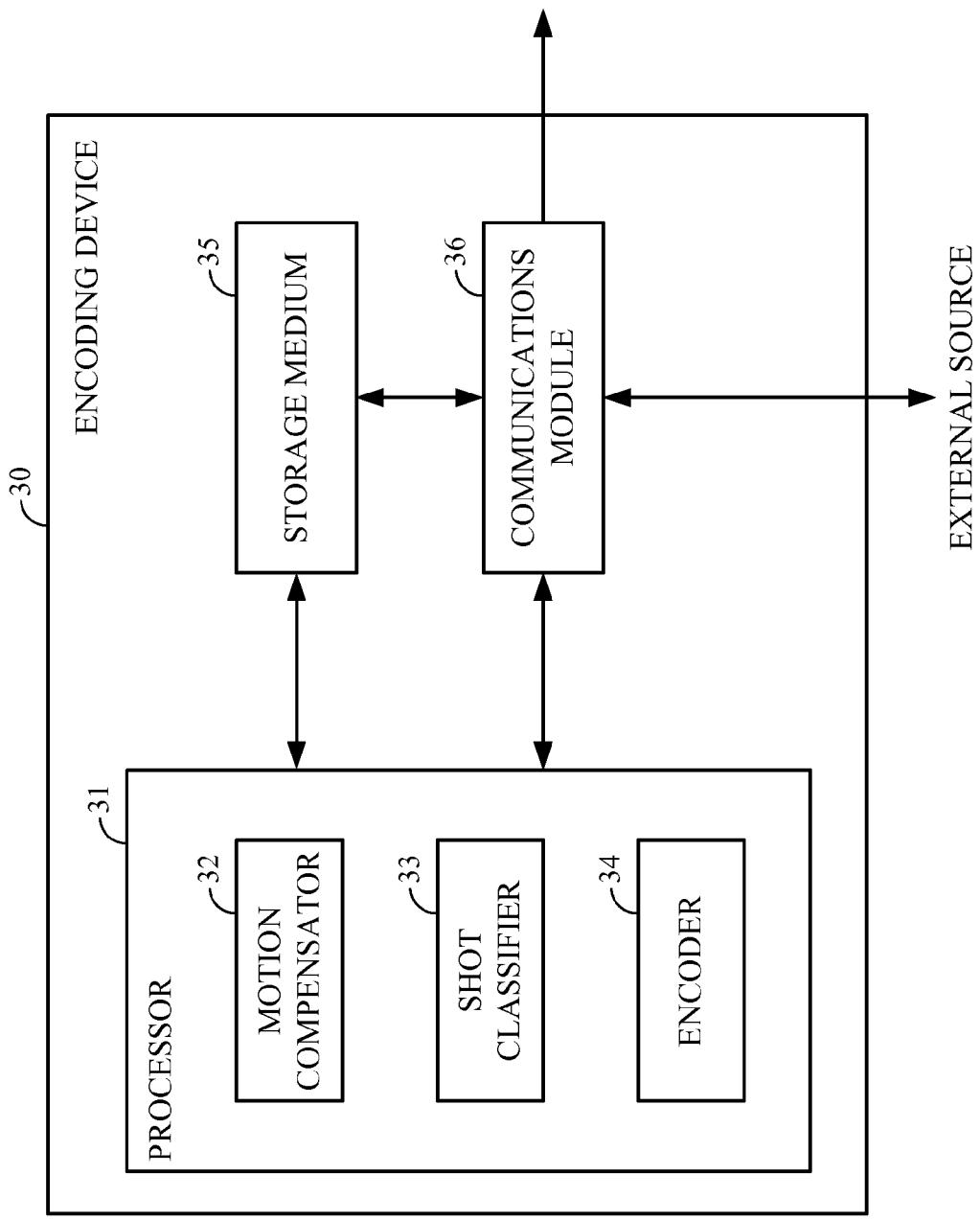
FIG. 3A is a block diagram of a processing device for shot detection and encoding based on the detected shots.

FIG. 3A is a block diagram of an multimedia processing device 30 comprising a processor 31 for shot detection and encoding based on the detected shots, according to some aspects. In some aspects, the multimedia processing device 30 in FIG. 3 can also be the encoding component 22 in FIG. 2. A digital video source can be provided by a source external to the multimedia processing device 30 and communicated to a communications module 36 in the multimedia processing device 30. The multimedia processing device 30 contains a storage medium 25 which communicates with the processor 31, both of which communicate with the communications module 36. The processor 31 includes a motion compensator 32, a shot classifier, and an encoder, which can operate to generate motion information, classify shots in frames of the video data, and encode the video data, and can The motion compensator, shot classier, and encoder can process video to determine information described below in reference to Equations 1-10. In particular, the processor 31 can have a configuration to obtain metrics indicative of a difference between adjacent frames of a plurality of video frames, the metrics comprising bi-directional motion information and luminance information, determine shot changes in the plurality of video frames based on said metrics, and adaptively encode the plurality of frames based on the shot changes. In some aspects, the metrics can be calculated by a device or process external to the processor 31, which can also be external to the multimedia processing device 30, and communicated to the processor 31, either directly or indirectly via another device or memory. The metrics can also be calculated by the processor 31, for example, by the motion compensator 32 of the processor 31.

Figure 3B:
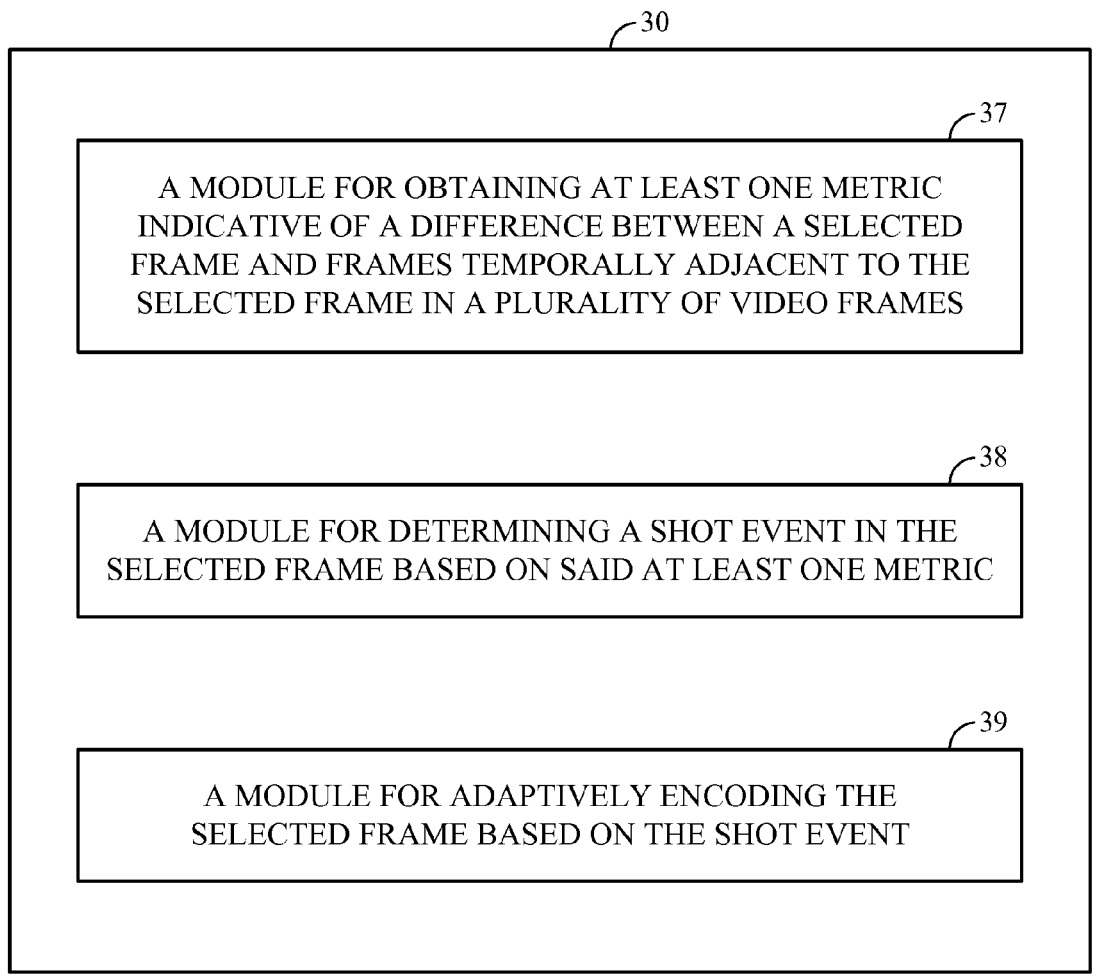
FIG. 3B is a block diagram of a processing device for shot detection and encoding based on the detected shots.

The multimedia processing device 30 can provide encoded video for further processing and/or transmission to other devices, for example, terminals 6 (FIG. 1). The encoded video can be, in some aspects, scalable multi-layered encoded video which can comprise a base layer and an enhancement layer. Scalable layer encoding is further described in co-pending U.S. patent application Ser. No. 11/373,604 entitled "SCALABLE VIDEO CODING WITH TWO LAYER ENCODING AND SINGLE LAYER DECODING" owned by the assignee hereof, and which is incorporated by reference in its entirety herein. FIG. 3B is a block diagram of another illustrative aspect of a multimedia processing device 30 for shot detection and encoding based on the detected shots. The multimedia processing device 30 includes means for obtaining at least one metric indicative of a difference between a selected frame and frames temporally adjacent to the selected frame, such as module 37. The multimedia processing device 30 also includes means for determining a shot event, such as a module 38 for determining a shot event in the selected frame based on the at least one metric, the metric being determined by module 37. An illustrative process of determining a shot event uses Equations 4-9 hereinbelow. The multimedia processing device 30 also includes means for adaptively encoding the selected frame based on the shot event such as module 39. In one aspect, if the shot event indicates that the selected frame is an abrupt scene change, the module 39 can adaptively encode the selected frame as an I-frame. In another aspect, if the shot event indicates the selected frame is a portion of a plurality of frames comprising a slow scene change, module 39 can adaptively encode the selected frame as either a P-frame or a B-frame. In another aspect, if the shot event indicates that the selected frame contains at least one camera flashlight, and module 39 can adaptively identify the selected frame as requiring special processing, which can include dropping the selected frame, replicating a frame adjacent to the selected frame and using the replicated frame for the selected frame, interpolating frames adjacent to the selected frame to form a new frame to replace the selected frame, performing error concealment on the selected frame, or performing another predetermined encoding process for the selected frame.

The various illustrative logical blocks, components, modules, and circuits described in connection with FIGS. 2, 3A, and 3B, and other examples and figures disclosed herein may be implemented or performed, in some aspects, with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor such as the one shown in FIG. 2 may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Video encoding usually operates on a structured group of pictures (GOP). A GOP normally starts with an intra-coded frame (I-frame), followed by a series of P (predictive) or B (bi-directional) frames. Typically, an I-frame can store all the data for displaying the frame, a B-frame relies on data in the preceding and following frames (e.g., only containing data changed from the preceding frame or is different from data in the next frame), and a P-frame contains data that has changed from the preceding frame.

In common usage, I-frames are interspersed with P-frames and B-frames in encoded video. In terms of size (e.g., number of bits used to encode the frame), I-frames are typically much larger than P-frames, which in turn are larger than B-frames. For efficient encoding, transmission and decoding processing, the length of a GOP should be long enough to reduce the efficient loss from big I-frames, and short enough to fight mismatch between encoder and decoder, or channel impairment. In addition, macro blocks (MB) in P frames can be intra coded for the same reason.

Scene change detection can be used for a video encoder to determine a proper GOP length and insert I-frames based on the GOP length, instead of inserting an often unneeded I-frame at a fixed interval. In a practical streaming video system, the communication channel is usually impaired by bit errors or packet losses. Where to place I-frames or I MBs may significantly impact decoded video quality and viewing experience. One encoding scheme is to use intra-coded frames for pictures or portions of pictures that have significant change from collocated previous pictures or picture portions. Normally these regions cannot be predicted effectively and efficiently with motion estimation, and encoding can be done more efficiently if such regions are exempted from inter-frame coding techniques (e.g., encoding using B-frames and P-frames). In the context of channel impairment, those regions are likely to suffer from error propagation, which can be reduced or eliminated (or nearly so) by intra-frame encoding.

A selected frame or a portions of the GOP video can be classified into two or more categories, where each frame or portion can have different intra-frame encoding criteria that may depend on the particular implementation. As an illustrative example, a selected frame in the video can processed to determine if it includes a certain "shot event" which can be used to classify the frame into one of three categories based on its content; that is, each category indicating a type of shot event that is captured by the frame or that the frame is a part of. These three categories are an abrupt scene change, a portion of a cross-fading and/or other slow scene change, or as a frame containing at least one camera flash, also referred to as "camera flashlights."

A frame that is classified as an abrupt scene change includes frames that are significantly different from the previous frame. These abrupt scene changes are usually caused by a camera operation during editing or generation of video. For example, video generated from different cameras can include abrupt scene changes because the cameras have different viewpoints. Also, abruptly changing the field of view of a camera while recording video can result in an abrupt scene change. Since the content of a frame classified as an abrupt scene change is different from that of the previous frame, an abrupt scene change frame should typically be encoded as an I-frame.

A frames that is classified as a portion of a slow scene change includes video having cross-fading and other slow scene changes or slow switching of scenes. In some examples, this can be caused by computer processing of camera shots. Gradual blending of two different scenes may look more pleasing to human eyes, but poses a challenge to video coding. For some slowly changing scenes, motion compensation may not reduce the bitrate of those frames effectively. In some circumstances, more intra-coded MBs can be used for these frames.

A frame is classified as having camera flashlights, or a camera flash event, can include frames with content that includes one or more camera flashes. Such flashes are relatively short in duration (e.g., one frame) and can be extremely bright such that the pixels in a frame portraying the flashes exhibit unusually high luminance relative to a corresponding area on an adjacent frame. Camera flashlights shift the luminance of a picture suddenly and swiftly. Usually the duration of a camera flashlight is shorter than the temporal masking duration of the human vision system (HVS), which is typically defined to be 44 ms. Human eyes are not sensitive to the quality of these short bursts of brightness and therefore they can be encoded coarsely. Because the flashlight frames cannot be handled effectively with motion compensation and they are bad prediction candidate for future frames, coarse encoding of these frames does not reduce the encoding efficiency of future frames. Scenes classified as flashlights should not be used to predict other frames because of the "artificial" high luminance, and other frames cannot effectively be used to predict these frames for the same reason. Once identified, these frames can be taken out because they may require a relatively high amount of processing. One option is to remove the frames that are determined to include camera flashlight and encode a DC coefficient in their place; such a solution is simple, computationally fast and can save many bits during encoding.

When any of the above types of scene changes are detected in a frame, a shot event is declared and the detected scene type can be used to determine how the frame can be encoded; in other words, the frame can be adaptively encoded based on the determined shot event. Shot detection is not only useful to improve encoding quality, it can also aid in identifying video content searching and indexing. One aspect of a scene detection process is described hereinbelow.

Figure 4:
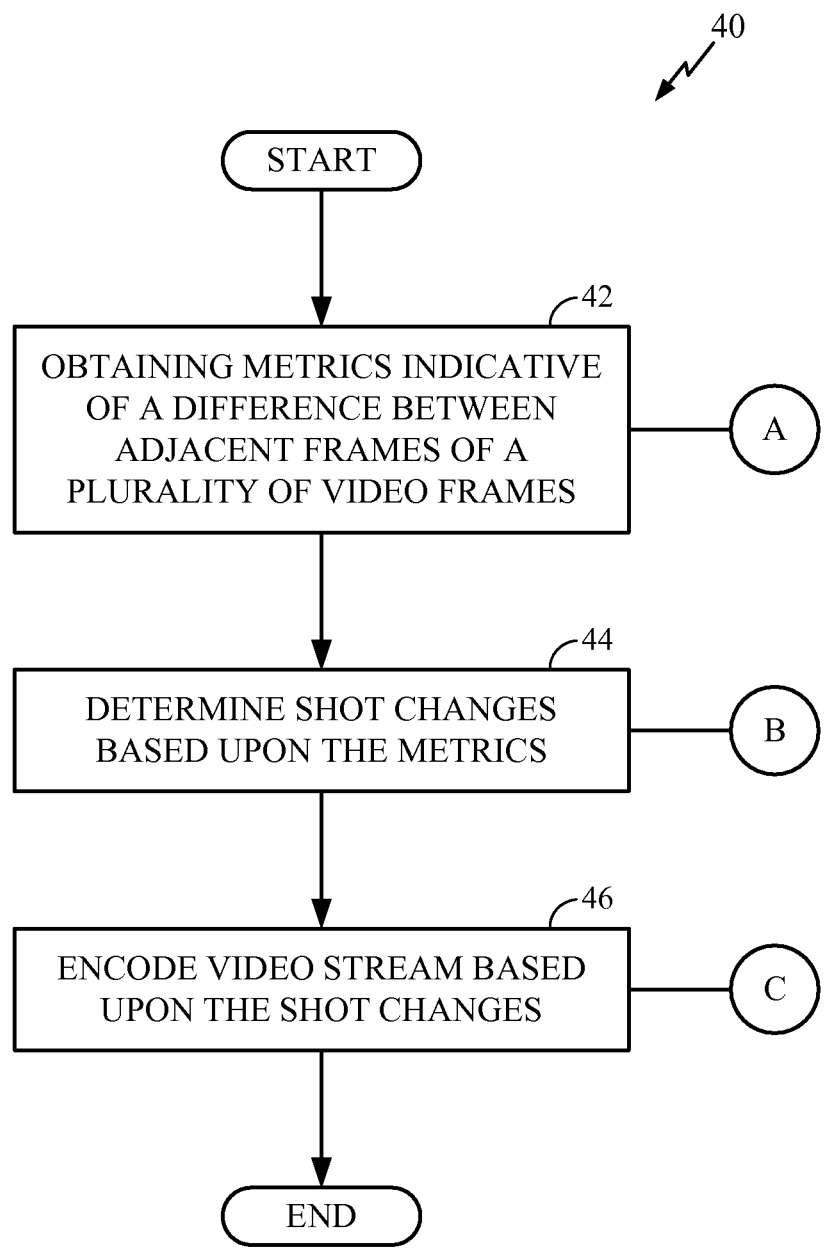
FIG. 4 is a flow diagram illustrating a method of encoding multimedia data based on shot detection.

FIG. 4 illustrates a process 40 that operates on a GOP and can be used in some aspects to encode video based on shot detection in video frames, where portions of the process 40 (or sub-processes) are described and illustrated with reference to FIGS. 5-10. The encoding component 22 (FIG. 2) or the processor 31 can be configured to incorporate process 40. After process 40 starts, it proceeds to block 42 where metrics (information) are obtained for the video frames, the metrics including information indicative of a difference between adjacent frames. The metrics includes bi-directional motion information and luminance-based information that is subsequently to determine changes that occurred between adjacent frames which can be used for shot classification. Such metrics can be obtained from another device or process, or calculated by, for example, encoding component 22 or processor 31. Illustrative examples of metrics generation are described in reference to process A in FIG. 5 and Equations 1-10.

Process 40 then proceeds to block 44 where shot changes in the video are determined based on the metrics. A video frame can be classified into two or more categories of what type of shot is contained in the frame, for example, an abrupt scene change, a slowly changing scene, or a scene containing high luminance values (camera flashes). Certain implementations encoding may necessitate other categories. An illustrative example of shot classification is described in reference to process B in FIG. 6, and in more detail with reference to processes D, E, and F in FIGS. 8-10, respectively.

Figure 7:
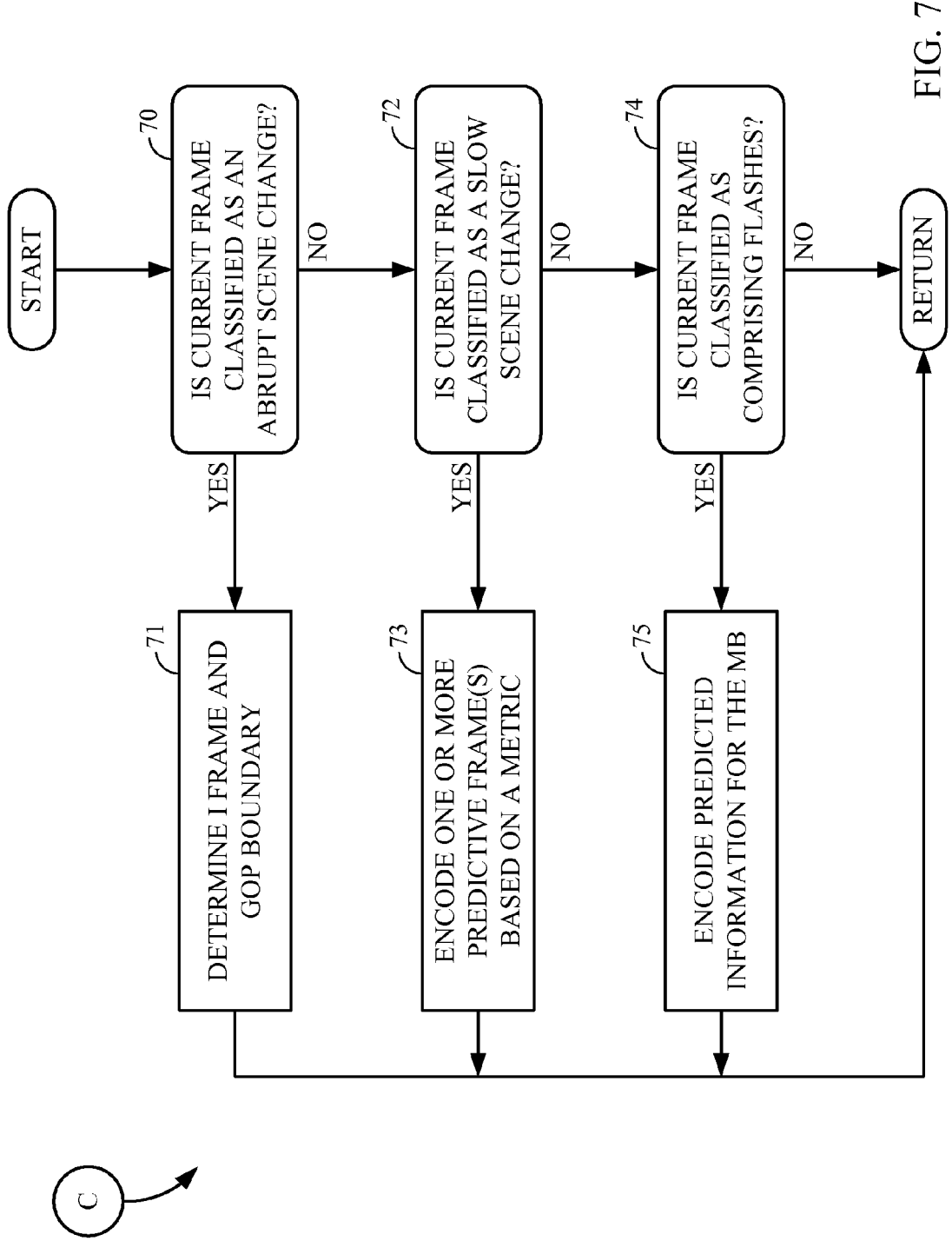
FIG. 7 is a flow diagram illustrating a method of encoding a video stream based upon the shot changes.

Once a frame is classified, process 40 proceeds to block 46 where the frame can be encoded, or designated for encoding, using the shot classification results. Such results can influence whether to encode the frame with an intra-coded frame or a predictive frame (e.g., P-frame or B-frame). Process C in FIG. 7 shows an example of an encoding scheme using the shot results.

Figure 5:
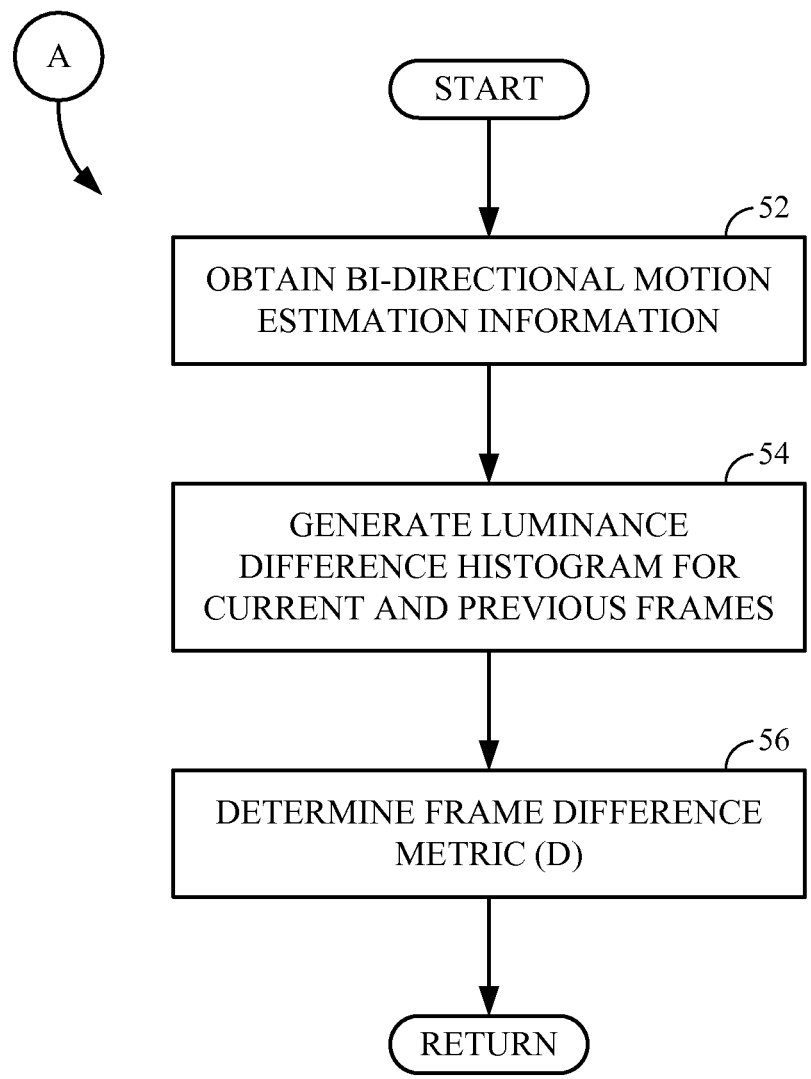
FIG. 5 is a flow diagram illustrating a method of obtaining metrics of a difference between adjacent frames of a plurality of video frames.

FIG. 5 illustrates an example of a process for obtaining metrics of the video. FIG. 5 illustrates certain steps that occur in block 42 of FIG. 4. Referring still to FIG. 5, in block 52, process A obtains or determines bi-directional motion estimation and compensation information of the video. The motion compensator 23 of FIGS. 2 and 3 can be configured to perform bi-directional motion estimation on the frames and determine motion compensation information that can be used for subsequent shot classification. Process A then proceeds to block 54 where it generates luminance information including a luminance difference histogram for a current or selected frame and one or more adjacent frames. Lastly, process A then continues to block 56 where a metric is calculated that indicative of the shot contained in the frame. One such metric is a frame difference metric which is shown in two examples in Equations 4 and 10. Illustrative examples of determining motion information, luminance information, and a frame difference metric are described below.

Motion Compensation

Figure 11:
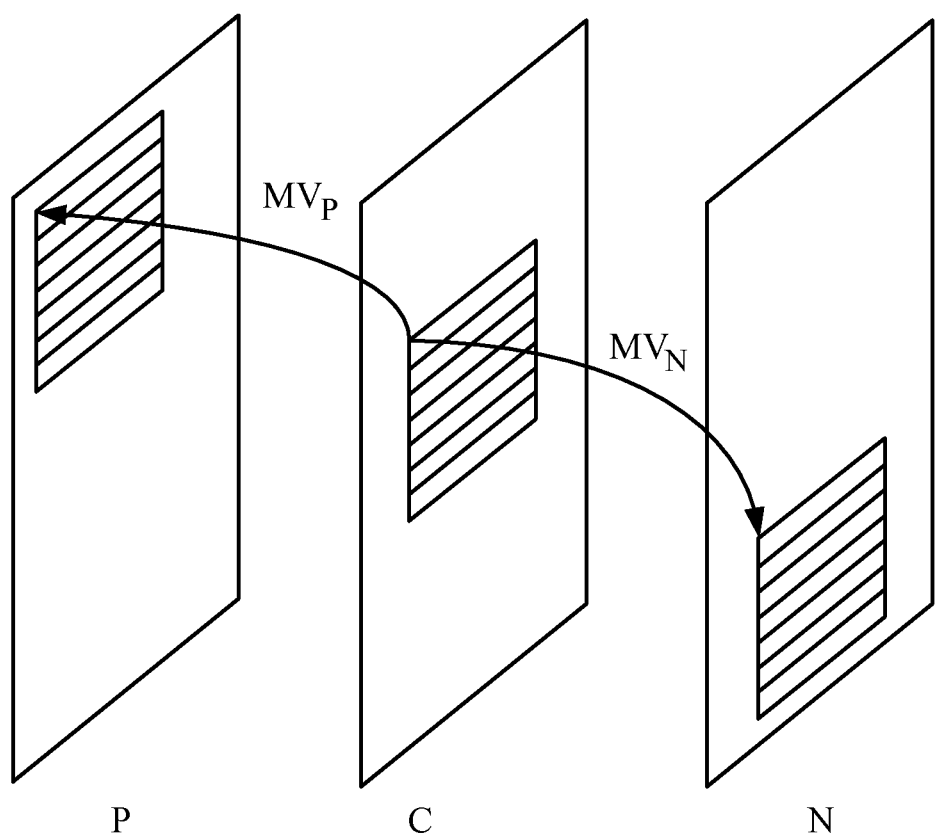
FIG. 11 is an illustration which shows an example of matching pixels of a current frame C to a past frame P and a future (or next) frame N.

To perform bi-directional motion estimation/compensation, a video sequence can be preprocessed with a bi-directional motion compensator that matches every 8×8 block of the current frame with blocks in two of the frames most adjacent neighboring frames, one in the past, and one in the future. The motion compensator produces motion vectors and difference metrics for every block. FIG. 11 illustrates this concept, showing an example of matching pixels of a current frame C to a past frame P and a future (or next) frame N, and depicts motion vectors to the matched pixels (past motion vector $MV_P$ and future motion vector $MV_N$. A brief description of an illustrative aspect of bi-directional motion vector generation and related encoding follows below.

Figure 13:
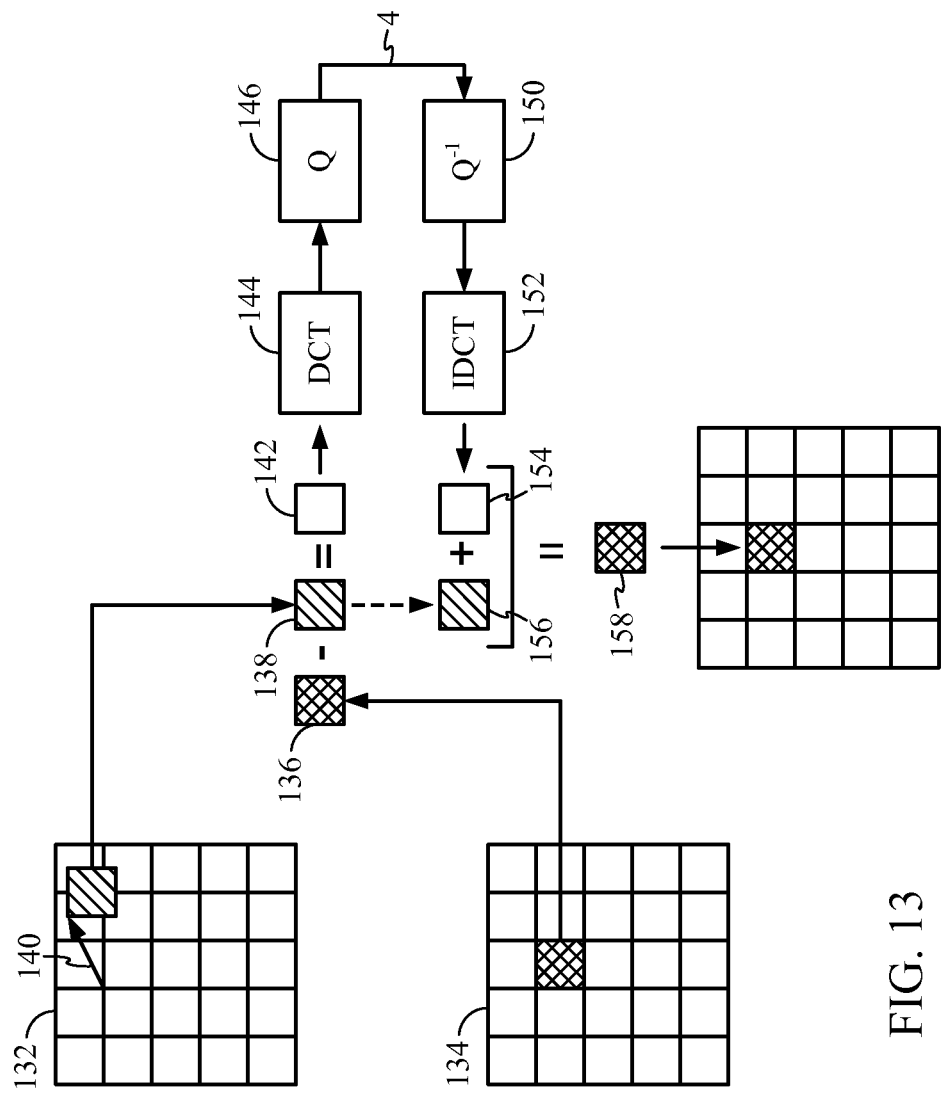
FIG. 13 illustrates an example of a motion vector determination process and predictive frame encoding.

FIG. 13 illustrates an example of a motion vector determination process and predictive frame encoding in, for example, MPEG-4. The process described in FIG. 13 is a more detailed illustration of an example process that can take place in block 52 of FIG. 5. In FIG. 13, current picture 134 is made up of 5×5 macroblocks, where the number of macroblocks in this example is arbitrary. A macroblock is made up of 16×16 pixels. Pixels can be defined by an 8-bit luminance value (Y) and two 8-bit chrominance values (Cr and Cb).

In MPEG, Y, Cr and Cb components can be stored in a 4:2:0 format, where the Cr and Cb components are down-sampled by 2 in the X and the Y directions. Hence, each macroblock would consist of 256 Y components, 64 Cr components and 64 Cb components. Macroblock 136 of current picture 134 is predicted from reference picture 132 at a different time point than current picture 134. A search is made in reference picture 132 to locate best matching macroblock 138 that is closest, in terms of Y, Cr and Cb values to current macroblock 136 being encoded. The location of best matching macroblock 138 in reference picture 132 is encoded in motion vector 140. Reference picture 132 can be an I-frame or P-frame that a decoder will have reconstructed prior to the construction of current picture 134. Best matching macroblock 138 is subtracted from current macroblock 136 (a difference for each of the Y, Cr and Cb components is calculated) resulting in residual error 142. Residual error 142 is encoded with 2D Discrete Cosine Transform (DCT) 144 and then quantized 146. Quantization 146 can be performed to provide spatial compression by, for example, allotting fewer bits to the high frequency coefficients while allotting more bits to the low frequency coefficients. The quantized coefficients of residual error 142, along with motion vector 140 and reference picture 134 identifying information, are encoded information representing current macroblock 136. The encoded information can be stored in memory for future use or operated on for purposes of, for example, error correction or image enhancement, or transmitted over network 4.

The encoded quantized coefficients of residual error 142, along with encoded motion vector 140 can be used to reconstruct current macroblock 136 in the encoder for use as part of a reference frame for subsequent motion estimation and compensation. The encoder can emulate the procedures of a decoder for this P-frame reconstruction. The emulation of the decoder will result in both the encoder and decoder working with the same reference picture. The reconstruction process, whether done in an encoder, for further inter-coding, or in a decoder, is presented here. Reconstruction of a P-frame can be started after the reference frame (or a portion of a picture or frame that is being referenced) is reconstructed. The encoded quantized coefficients are dequantized 150 and then 2D Inverse DCT, or IDCT, 152 is performed resulting in decoded or reconstructed residual error 154. Encoded motion vector 140 is decoded and used to locate the already reconstructed best matching macroblock 156 in the already reconstructed reference picture 132. Reconstructed residual error 154 is then added to reconstructed best matching macroblock 156 to form reconstructed macroblock 158. Reconstructed macroblock 158 can be stored in memory, displayed independently or in a picture with other reconstructed macroblocks, or processed further for image enhancement.

Encoding using B-frames (or any section coded with bi-directional prediction) can exploit temporal redundancy between a region in a current picture and a best matching prediction region in a previous picture and a best matching prediction region in a subsequent picture. The subsequent best matching prediction region and the previous best matching prediction region are combined to form a combined bi-directional predicted region. The difference between the current picture region and the best matching combined bi-directional prediction region is a residual error (or prediction error). The locations of the best matching prediction region in the subsequent reference picture and the best matching prediction region in the previous reference picture can be encoded in two motion vectors.

Luminance Histogram Difference

In one aspect, the motion compensator can produce a difference metric for every block. The difference metric is based on luminance differences between a blocks in one frame and corresponding blocks in a temporally adjacent previous frame and a temporally adjacent next frame. The difference metric can, for example, include a sum of square differences (SSD) or a sum of absolute differences (SAD). Without a loss of generality, here SAD is used as an illustrative example.

For the current (or selected) frame, a SAD ratio is calculated as shown in Equation 1:

$$\gamma = \frac{\varepsilon + SAD_P}{\varepsilon + SAD_N} \quad [1]$$

where $SAD_P$ and $SAD_N$ are the sum of absolute differences of the forward and the backward difference metric, respectively, for a selected frame. It should be noted that the denominator contains a small positive number $\varepsilon$ to prevent the "divide-by-zero" error. The nominator also contains a value $\varepsilon$ to balance the effect of the unity in the denominator. For example, if the previous frame, the current frame, and the next frame are identical, motion search should yield $SAD_P = SAD_N = 0$. In this case, the above calculation generators $\gamma = 1$ instead of 0 or infinity.

A luminance histogram can be calculated for every frame. Typically the multimedia images have a luminance depth (e.g., number of "bins") of eight bits. The luminance depth used for calculating the luminance histogram according to some aspects can be set to 16 to obtain the histogram. In other aspects, the luminance depth can be set to an appropriate number which may depend upon the type of data being processed, the computational power available, or other predetermined criteria. In some aspects, the luminance depth can be set dynamically based on a calculated or received metric, such as the content of the data.

Equation 2 illustrates one example of calculating a luminance histogram difference (lambda):

$$\lambda = \sum_{i=1}^{16} |N_{Pi} - N_{Ci}|/N \qquad [2]$$

where $N_{Pi}$ is the number of blocks in the $i^{th}$ bin for the previous frame, and $N_{Ci}$ is the number of blocks in the $i^{th}$ bin for the current frame, and N is the total number of blocks in a frame. If the luminance histogram difference of the previous and the current frame are completely dissimilar (or disjoint), then $\lambda=2$.

A frame difference metric D, discussed in reference to block 56 of FIG. 5, can be calculated, as shown in Equation 3:

$$D = \frac{\gamma_C}{\gamma_P} + A\lambda(2\lambda + 1) \qquad [3]$$

where A is a constant chosen by application, and $$\gamma_C = \frac{\varepsilon + SAD_P}{\varepsilon + SAD_N}, \text{ and } \gamma_P = \frac{\varepsilon + SAD_{PP}}{\varepsilon + SAD_C}.$$

Figure 6:
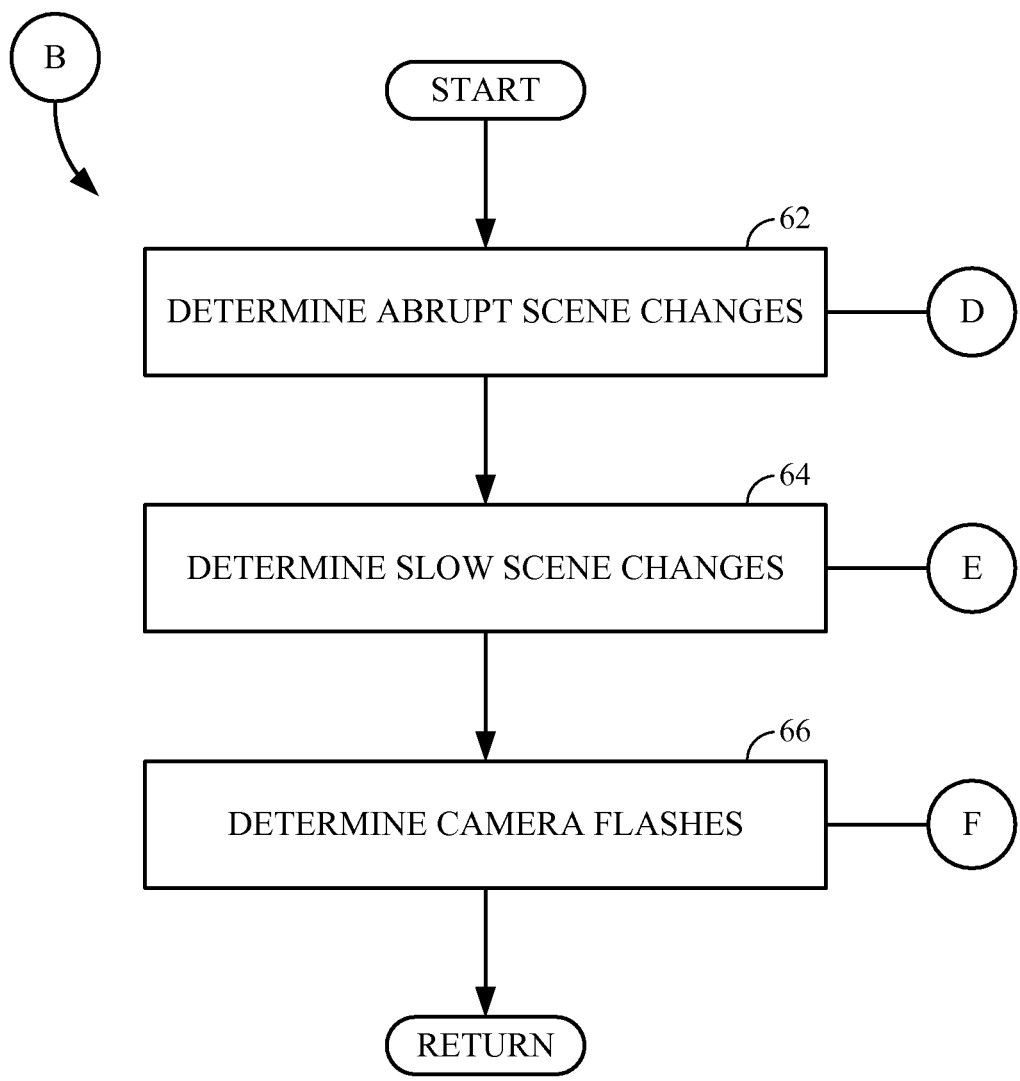
FIG. 6 is a flow diagram illustrating a method of determining shot changes based upon the determined metrics.
Figure 8:
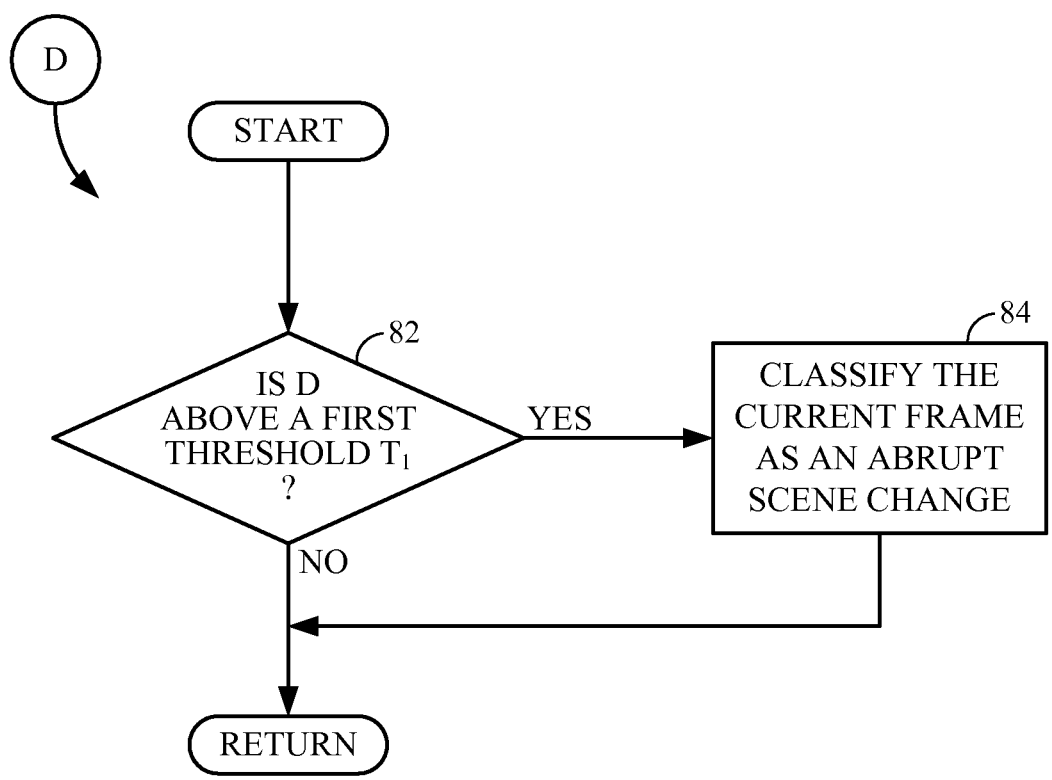
FIG. 8 is a flow diagram illustrating a method of determining abrupt scene changes.
Figure 9:
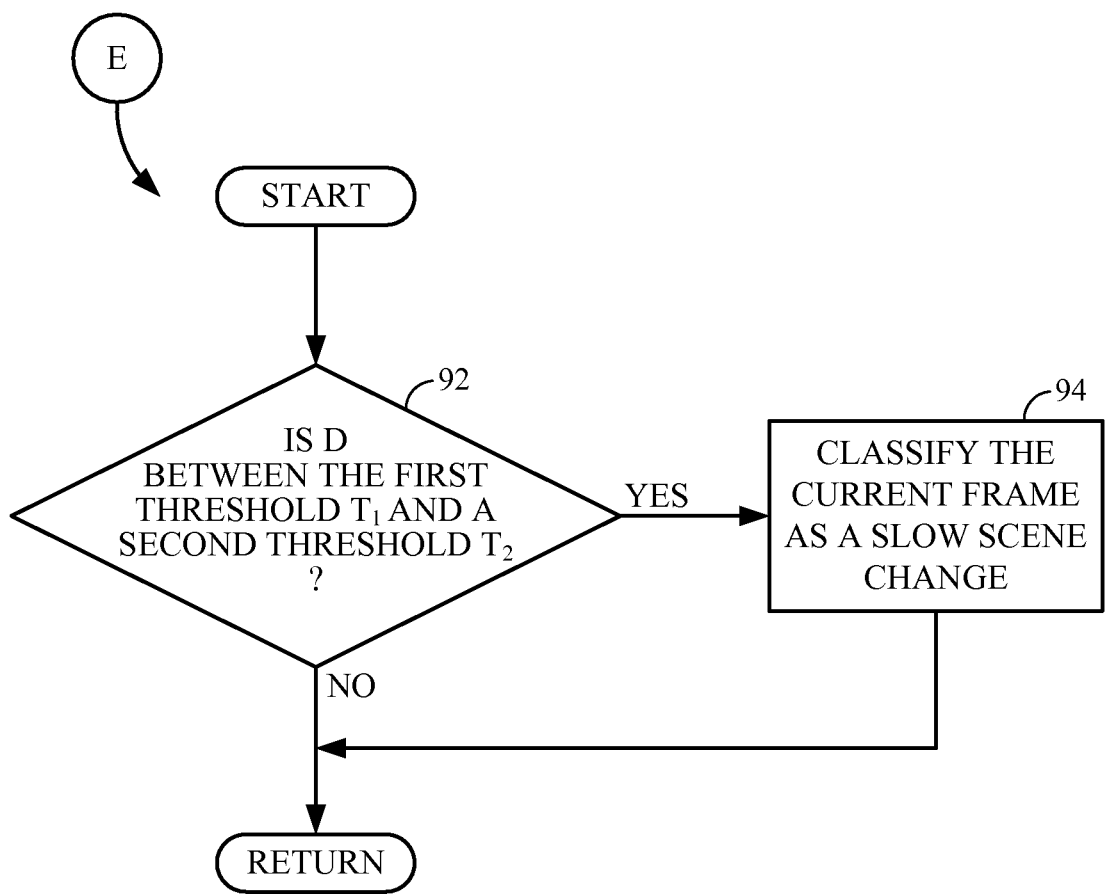
FIG. 9 is a flow diagram illustrating a method of determining slow scene changes.
Figure 10:
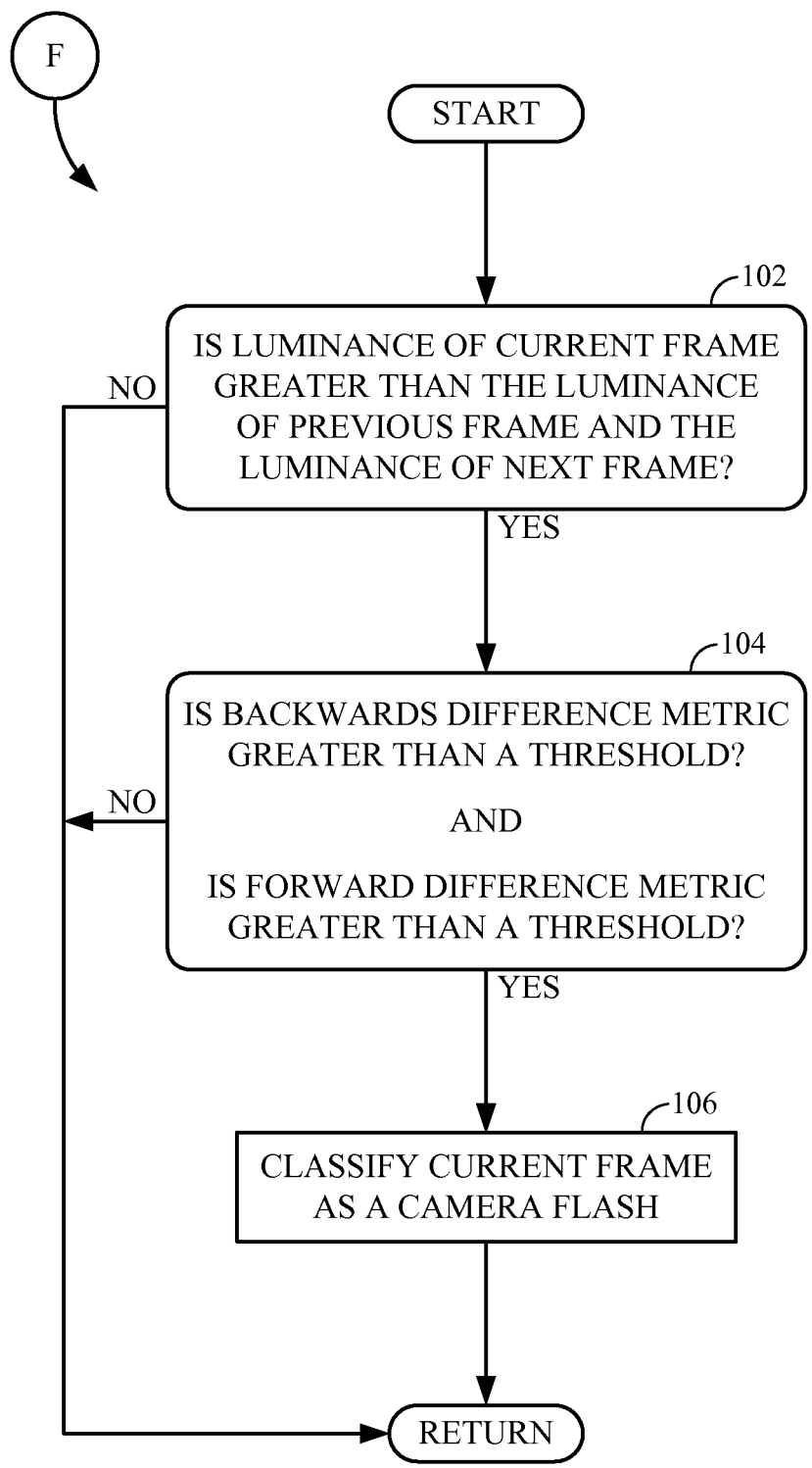
FIG. 10 is a flow diagram illustrating a method of determining camera flashes.

FIG. 6 illustrates an example of a process B which determines three categories of shot (or scene) changes using metrics obtained or determined for the video. FIG. 6 illustrates certain steps occurring in one aspect of block 44 of FIG. 4. Again referring to FIG. 6, in block 62, process B first determines if the frame meets certain conditions or one or more criteria to be designated an abrupt scene change. Process D in FIG. 8 illustrates an example of this determination. Process B then proceeds to block 64 where it determines of the frame is part of a slowly changing scene. Process C in FIG. 9 illustrates an example of determining a slow changing scene. Finally, at block 66 process B determines if the frame contains camera flashes, in other words, large luminance values differing from the previous frame. Process F in FIG. 10 illustrates an example of determining a frame containing camera flashes. An illustrative example of these processes is described below.

Abrupt Scene Change

FIG. 8 is a flow diagram illustrating a process of determining abrupt scene changes. FIG. 8 further elaborates certain steps that can occur in some aspects of block 62 of FIG. 6. At block 82 if the frame difference metric D meets the criterion shown in Equation 4:

$$D = \frac{\gamma_C}{\gamma_P} + A\lambda(2\lambda + 1) \geq T_1 \qquad [4]$$

where A is a constant chosen by application, and $T_1$ is a threshold value (e.g., a threshold criterion). If the threshold value is met, at block 84 process D designates the frame as an abrupt scene change and, in this example, no further shot classification may be needed.

In one example simulation shows, setting A=1, and $T_1=5$ achieve good detection performance. If the current frame is an abrupt scene change frame, then $\gamma_C$ should be large and $\gamma_P$ should be small. The ratio $$\frac{\gamma_C}{\gamma_P}$$

can be used instead of $\gamma_C$ alone so that the metric is normalized to the activity level of the context.

Figure 12:
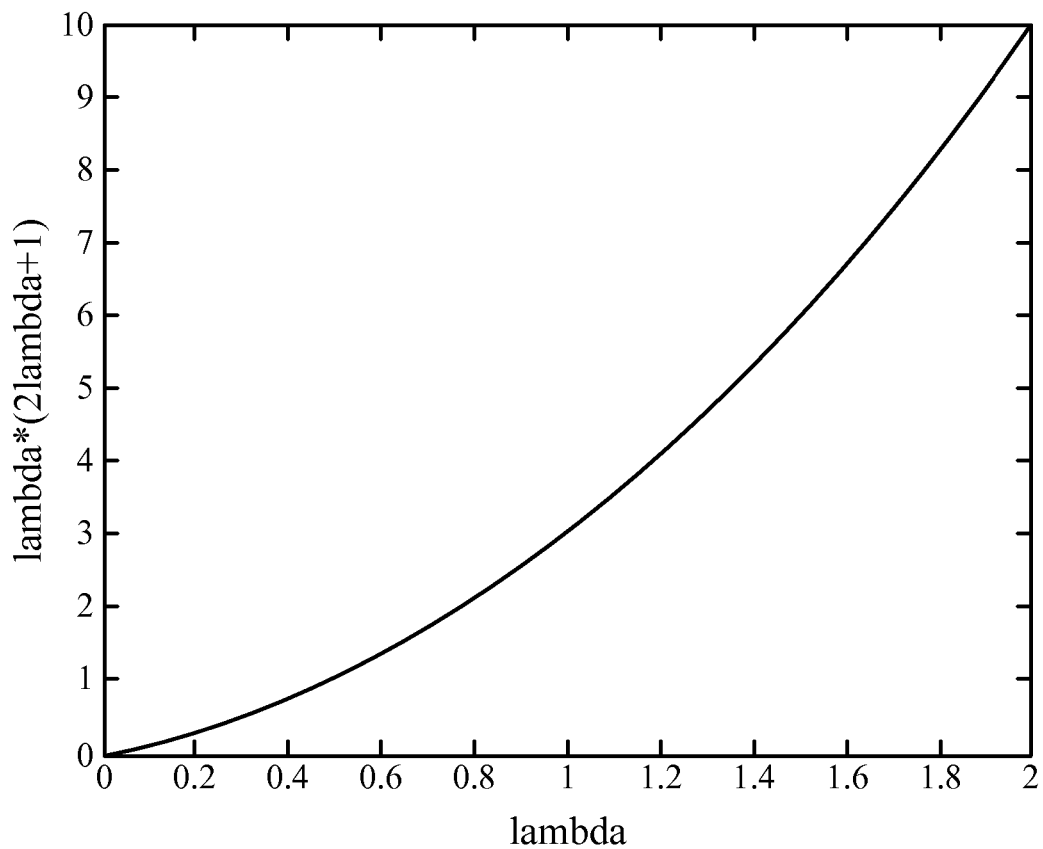
FIG. 12 is a graph showing a relationship of the luminance histogram difference value lambda and lambda*(2*lambda+1)

It should be noted that the criterion the luminance histogram difference lambda ($\lambda$) is used in Equation 4 in a non-linear way. FIG. 12 illustrates $\lambda*(2\lambda+1)$ is a convex function. When lambda ($\lambda$) is small (e.g., close to zero), the contribution of $\lambda*(2\lambda+1)$ is relatively small. However, as $\lambda$ becomes larger, the function $\lambda*(2\lambda+1)$ has increased emphasis. For any lambda ($\lambda$) larger than 1.4, an abrupt scene change is detected if the threshold value $T_1$ is set to be 5.

Cross-Fading and Slow Scene Changes

FIG. 9 further illustrates further details of some aspects that can occur in block 64 of FIG. 6. Referring to FIG. 9, at block 92 process E determines if the frame is part of a series of frames depicting a slow scene change. Process E determines that the current frame is a cross-fading or other slow scene change if the frame difference metric D is less than the first threshold value $T_1$ and greater or equal to a second threshold value $T_2$ as illustrated in Equation 5:

$$T_2 \leq D < T_1 \qquad [5]$$

for a certain number of continuous frames, where $T_1$ is the same threshold value as used in Equation 4 and $T_2$ is another threshold value. Typically, the criteria $T_1$ and $T_2$ are determined by normal experimentation or simulation because of the difference in implementations that are possible. If the criteria in Equation 5 are satisfied, at block 94 process E classifies the frame as part of a slow changing scene. No further classification of the frame may be needed, and shot classification for the selected frame ends.

Camera Flashlight Events

Process F shown in FIG. 10 is an example of a process that can determine if the current frame comprises camera flashlights. In this illustrative aspect camera, the luminance histogram statistics are used to determine if the current frame comprises camera flashlights. Process F determines camera flash events are in the selected frame by first determining if the luminance of a current frame is greater than the luminance of the previous frame and the luminance of the next frame, shown at block 102. If not, the frame is not a camera flash event; but if so it may be. At block 104, Process F determines whether the backwards difference metric is greater or equal to a certain threshold value, and if the forwards difference metric is greater or equal to a threshold value; if both these conditions are satisfied, at block 106 process F classifies the current frame as having camera flashlights.

In one illustrative example, at block 102, process F determines if the average luminance of the current frame minus the average luminance of the previous frame is equal of exceeds a threshold value $T_3$, and process F also determines if the average luminance of the current frame minus the average luminance of the next frame is greater than or equal to the threshold value $T_3$, as shown in Equations 6 and 7:

$$\bar{Y}_C - \bar{Y}_P \geq T_3 \qquad [6]$$

$$\bar{Y}_C - \bar{Y}_N \geq T_3 \qquad [7]$$

If the criteria of Equations 6 and 7 are not satisfied, the current frame is not classified as comprising camera flashlights and process F returns. If the criteria illustrated in Equations 6 and 7 are satisfied, process F proceeds to block 104 where it determines if a backwards difference metric $SAD_P$ and a forward difference metric $SAD_N$ are greater or equal to a certain threshold value T4, as illustrated in Equations 8 and 9 below:

$$SAD_P \geq T_4 \qquad [8]$$

$$SAD_N \geq T_4 \qquad [9]$$

where $\bar{Y}_C$ is the average luminance of the current frame, $\bar{Y}_P$ is the average luminance of the previous frame, $\bar{Y}_N$ is the average luminance of the next frame, and $SAD_P$ and $SAD_N$ are the forward and backward difference metrics, respectively, associated with the current frame. If the criteria illustrated in Equations 8 and 9 are not satisfied, process F returns; if the criteria are satisfied, the shot event indicates the frame contains at least one camera flashlight.

Values of threshold $T_3$ are typically determined by normal experimentation as the implementation of the described processes can result in differences in operating parameters including threshold values. SAD values are included in the determination because camera flashes typically take only one frame, and due to the luminance difference, this frame cannot be predicted well using motion compensation from both the forward and the backward direction.

In some aspects, one or more of the threshold values $T_1$, $T_2$, $T_3$, and $T_4$ are predetermined and such values are incorporated into the shot classifier in the encoding device. Typically, these threshold values are selected through testing of a particular implementation of shot detection. In some aspects, one or more of the threshold values $T_1$, $T_2$, $T_3$, and $T_4$ can be set during processing (e.g., dynamically) based on using information (e.g., metadata) supplied to the shot classifier or based on information calculated by the shot classifier itself.

Referring now to FIG. 7 which shows a process C for determining encoding parameters for the video, or for encoding the video, based on the shot classification of the selected frame. At block 70 process C determines if the selected frame was classified as an abrupt scene change. If so, at block 71 the current frame is classified as an abrupt scene change, and the frame can be encoded as an I-frame and a GOP boundary can be determined. If not, process C proceeds to block 72; if the current frame is classified as a portion of a slowly changing scene, at block 73 the current frame, and other frames in the slow changing scene can be encoded as a predictive frame (e.g., P-frame or B-frame). Process C then proceeds to block 74 where it checks if the current frame was classified as a scene comprising one or more camera flashes (flashlights). If so, at block 75 the frame can be identified for special processing. The special processing can include, for example, removal of the selected frame, replication of an adjacent frame and substitution for the selected frame (e.g., a previous or a subsequent frame), or encoding a particular coefficient for the frame. If the frame was not classified as containing one or more camera flashes, a particular shot event is not determined for the selected frame and it can be encoded in accordance with other one or more criteria, encoded as an I-frame, or skipped (e.g., dropped) such that the selected frame is not encoded. Process C can be implemented in an encoder 25 (e.g., FIG. 2) or a processor 31 (e.g., in encoder 34 in the processor 31 in FIG. 3).

In the above-described aspect, the amount of difference between the frame to be compressed and its adjacent two frames is indicated by a frame difference metric D. If a significant amount of a monotonic luminance change is detected, it signifies a cross-fade effect in the frame. The more prominent the cross-fade is, the more gain may be achieved by using B frames. In some aspects, a modified frame difference metric is used as shown in Equation 10 below:

$$D_1 = \begin{cases} \left(1 - \alpha + 2\alpha \frac{|d_P - d_N|}{d_P + d_N}\right) \times D, & \text{if } Y_P - \Delta \geq Y_C \geq Y_N + \Delta \text{ or } Y_P + \Delta \leq Y_C \leq Y_N - \Delta, \\ D, & \text{otherwise,} \end{cases} \quad [10]$$

where $d_P=|Y_C-Y_P|$ and $d_N=|Y_C-Y_N|$ are the luma difference between the current frame and the previous frame, and the luma difference between the current frame and the next frame, respectively, $\Delta$ represents a constant that can be determined in normal experimentation as it can depend on the implementation, and $\alpha$ is a weighting variable having a value between 0 and 1.

The modified frame difference metric $D_1$ is only different from the original frame difference metric $D$ if a consistent trend of luma shift is observed and the shift strength is large enough. $D_1$ is equal to or less than D. If the change of luma is steady ($d_P=d_N$), the modified frame difference metric $D_1$ is lower than the original frame difference metric D with the lowest ratio of $(1-\alpha)$.

Table 1 below shows performance improvement by adding abrupt scene change detection. The total number of I-frames in both the non-scene-change (NSC) and the scene-change (SC) cases are approximately the same. In the NSC case, I-frames are distributed uniformly among the whole sequence, while in the SC case, I-frames are only assigned to abrupt scene change frames.

It can be seen that typically 0.2~0.3 dB improvement can be achieve PSNR-wise. Simulation results show that the shot detector is very accurate in determining the shot events above-mentioned. Simulation of five clips with normal cross-fade effect shows that at $\Delta=5.5$ and $\alpha=0.4$, a PSNR gain of 0.226031 dB is achieved at the same bitrate.

TABLE 1

Simulation results of abrupt scene change detection

| | Metric | | |
|---|---|---|---|
| Sequence | Bitrate (kbps) | Avg. QP | PSNR (dB) |
| Animation NSC | 226.2403 | 31.1696 | 35.6426 |
| Animation SC | 232.8023 | 29.8171 | 36.4513 |
| Music NSC | 246.6394 | 32.8524 | 35.9337 |
| Music SC | 250.0994 | 32.3209 | 36.1202 |
| Headline NSC | 216.9493 | 29.8304 | 38.9804 |
| Headline News SC | 220.2512 | 28.9011 | 39.3151 |
| Basketball NSC | 256.8726 | 33.1429 | 33.5262 |
| Basketball SC | 254.9242 | 32.4341 | 33.8635 |

It is noted that the shot detection and encoding aspects described herein may be described as a process which is depicted as a flowchart, a flow diagram, a structure diagram, or a block diagram. Although the flowcharts shown in the figures may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

It should also be apparent to those skilled in the art that one or more elements of a device disclosed herein may be rearranged without affecting the operation of the device. Similarly, one or more elements of a device disclosed herein may be combined without affecting the operation of the device. Those of ordinary skill in the art would understand that information and multimedia data may be represented using any of a variety of different technologies and techniques. Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

For example, the steps of a method or algorithm described in connection with the shot detection and encoding examples and figures disclosed herein may be embodied directly in hardware, in a software module executed by a processor, or in a combination of the two. The methods and algorithms are particularly applicable to communication technology including wireless transmissions of video to cell phones, computers, laptop computers, PDA's and all types of personal and business communication devices software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

In addition, the various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added without departing from the spirit or scope of the disclosed method and apparatus. The description of the aspects is intended to be illustrative, and not to limit the scope of the claims.

What is claimed is:

1. A method of processing multimedia data, the method comprising:
    obtaining at least one metric indicative of a difference between a selected frame and frames temporally adjacent to the selected frame in a plurality of video frames, said at least one metric comprising bi-directional motion information and luminance difference information associated with the selected frame and the frames temporally adjacent to the selected frame;
    determining a shot event associated with the selected frame based on said at least one metric, wherein said determining a shot event comprises determining that the selected frame contains at least one camera flashlight if the selected frame is not an abrupt frame or a slow change frame, an average luminance of the selected frame minus an average luminance of a temporally adjacent frame of the selected frame is equal to or exceeds a first threshold value, and a forward difference metric and a backward difference metric associated with the selected frame are both equal to or exceed a second threshold value; and
    adaptively encoding the selected frame based on the shot event.

2. The method of claim 1, wherein obtaining at least one metric comprises calculating the at least one metric.

3. The method of claim 1, wherein the shot event indicates that the selected frame is an abrupt scene change, and wherein adaptively encoding comprises encoding the selected frame as an I-frame.

4. The method of claim 1, wherein the shot event indicates the selected frame is a portion of a plurality of frames comprising a slow scene change, and wherein adaptively encoding comprises encoding the selected frame as either a P-frame or a B-frame.

5. The method of claim 1, wherein adaptively encoding comprises identifying the selected frame as requiring special processing.

6. The method of claim 5, wherein the special processing comprises skipping the selected frame such that the selected frame is not encoded.

7. The method of claim 5, wherein the special processing comprises replicating a frame temporally adjacent to the selected frame and substituting the replicated frame for the selected frame.

8. The method of claim 1, wherein the shot event indicates the selected frame comprises an abrupt scene change, a portion of a slow scene change, or at least one camera flashlight.

9. The method of claim 1, wherein adaptively encoding comprises encoding the selected frame as an I-frame if the shot event does not indicate the selected frame comprises abrupt scene change, a portion of a slow scene change, or at least one camera flashlight.

10. The method of claim 1, wherein adaptively encoding comprises dropping the selected frame if the shot event does not indicate the selected frame comprises an abrupt scene change, a portion of a slow scene change, or at least one camera flashlight.

11. The method of claim 1, wherein the at least one metric comprises a frame difference metric, and wherein determining a shot event comprises determining the selected frame is an abrupt scene if the frame difference metric is greater than a third threshold value $T_3$.

12. The method of claim 11, wherein the frame difference metric for the selected frame is based on a ratio of a first difference metric and a second difference metric, wherein the first difference metric comprises a ratio of differences between the selected frame and a previous temporally adjacent frame, and the selected frame and a next temporally adjacent frame, and the second difference metric comprises a ratio of differences between the previous frame and a frame temporally adjacent and previous to the previous frame, and the differences between the previous frame and the selected frame.

13. The method of claim 11, wherein the frame difference metric for the selected frame comprises a ratio of $\gamma_C$ and $\gamma_P$, where $\gamma_C$ is a ratio of a forward and a backward difference metric for the current selected frame, and $\gamma_P$, is a ratio of a forward and a backward difference metric for a temporally adjacent and previous frame to the current selected frame.

14. The method of claim 11, wherein the frame difference metric is based on a luminance histogram difference associated with a frame temporally previous to the selected frame and the selected frame.

15. The method of claim 11, wherein determining a shot event comprises determining the selected frame to be a portion of a slow scene change if the selected frame is not determined to be an abrupt scene change and said frame difference metric indicates a difference between the selected frame and adjacent frames is less than the third threshold value $T_3$ and is greater than or equal to a fourth threshold value $T_4$.

16. The method of claim 1, wherein said determining a shot event comprises evaluating luminance difference information of the selected frame against at least one threshold value.

17. The method of claim 1, wherein the shot events are classified into three or more shot types.

18. The method of claim 1, wherein obtaining at least one metric comprises performing bi-directional motion compensation to generate bi-directional motion information, and wherein said bi-directional motion information and luminance difference information are determined for the selected frame based on the bi-directional motion compensation.

19. The method of claim 1, wherein determining a shot event comprises evaluating the at least one metric against a plurality of threshold values.

20. An apparatus for processing a multimedia data, comprising:
a motion compensator configured to obtain at least one metric indicative of a difference between a selected frame and frames temporally adjacent to the selected frame in a plurality of video frames, said at least one metric comprising bi-directional motion information and luminance information;
a shot classifier configured to determine shot events associated with the selected frame based on said at least one metric, wherein the shot classifier is further configured to determine that the selected frame contains at least one camera flashlight if the selected frame is not an abrupt frame or a slow change frame, an average luminance of the selected frame minus an average luminance of a temporally adjacent frame of the selected frame is equal to or exceeds a first threshold value, and a forward difference metric and a backward difference metric associated with the selected frame are both equal to or exceed a second threshold value; and
an encoder configured to adaptively encode the selected frame based on the shot event.

21. An apparatus for processing multimedia data, comprising:
means for obtaining at least one metric indicative of a difference between a selected frame and frames temporally adjacent to the selected frame in a plurality of video frames, said at least one metric comprising bi-directional motion information and luminance difference information associated with the selected frame and the frames temporally adjacent to the selected frame;
means for determining a shot event associated with the selected frame based on said at least one metric, wherein said means for determining a shot event comprises means for classifying the selected frame as a camera flash scene if the selected frame is not an abrupt frame or a slow change frame, an average luminance of the selected frame minus an average luminance of a temporally adjacent frame of the selected frame is equal to or exceeds a first threshold value, and a forward difference metric and a backward difference metric associated with the selected frame are both equal to or exceed a second threshold value; and
means for adaptively encoding the selected frame based on the shot event.

22. The apparatus of claim 21, wherein the shot event indicates that the selected frame is an abrupt scene change, and wherein the adaptively encoding means comprise means for encoding the selected frame as an I-frame.

23. The apparatus of claim 21, wherein the shot event indicates the selected frame is a portion of a plurality of frames comprising a slow scene change, and wherein the adaptively encoding means comprise means for encoding the selected frame as either a P-frame or a B-frame.

24. The apparatus of claim 21, wherein the shot event indicates that the selected frame contains at least one camera flashlight, and wherein the adaptively encoding means comprise means for identifying the selected frame as requiring special processing.

25. The apparatus of claim 21, wherein the special processing comprises skipping or dropping the selected frame such that the selected frame is not encoded.

26. The apparatus of claim 25, wherein the special processing comprises means for replicating a frame temporally adjacent to the selected frame and substituting the replicated frame for the selected frame.

27. The apparatus of claim 21, wherein the shot event indicates the selected frame comprises an abrupt scene change, a portion of a slow scene change, or includes at least one camera flashlight.

28. The apparatus of claim 21, wherein the adaptively encoding means comprise means for encoding the selected frame as an I-frame if the shot event does not indicate the selected frame comprises an abrupt scene change, a portion of a slow scene change, or at least one camera flashlight.

29. The apparatus of claim 21, wherein adaptively encoding means comprise dropping the selected frame if the shot event does not indicate the selected frame comprises an abrupt scene change, a portion of a slow scene change, or at least one camera flashlights.

30. The apparatus of claim 21, wherein the at least one metric comprises a frame difference metric, and wherein the determining a shot event means comprise means for determining the selected frame is an abrupt scene if the frame difference metric is greater than a third threshold value $T_3$.

31. The apparatus of claim 30, wherein the frame difference metric for the selected frame is based on a ratio of a first difference metric and a second difference metric, wherein the first difference metric comprises a ratio of differences between the selected frame and a previous temporally adjacent frame, and the selected frame and a next temporally adjacent frame, and the second difference metric comprises a ratio of differences between the previous frame and a frame temporally adjacent and previous to the previous frame, and the differences between the previous frame and the selected frame.

32. The apparatus of claim 30, wherein the frame difference metric for the selected frame comprises a ratio of $\gamma_C$ and $\gamma_P$, wherein $\gamma_C$ is a ratio of a forward and a backward difference metric for the current selected frame, and $\gamma_P$, is a ratio of a forward and a backward difference metric for a temporally adjacent and previous frame to the selected frame.

33. The apparatus of claim 30, wherein the frame difference metric is based on a luminance histogram difference associated with an adjacent frame temporally previous to the selected frame and the selected frame.

34. The apparatus of claim 30, wherein the determining a shot event means comprise means for classifying the selected frame as a slow scene change if the selected frame is not classified as an abrupt scene change and the frame difference metric indicates a difference between the selected frame and adjacent frames is less than the third threshold value $T_3$ and greater than or equal to a fourth threshold value $T_4$.

35. A non-transitory machine readable medium comprising instructions for processing multimedia data, wherein the instructions upon execution cause a machine to:
   obtain at least one metric indicative of a difference between a selected frame and frames temporally adjacent to the selected frame in a plurality of video frames, said at least one metric comprising bi-directional motion information and luminance difference information associated with the selected frame and the frames temporally adjacent to the selected frame;
   determine a shot event associated with the selected frame based on said at least one metric, wherein the determination of a shot event comprises determining that the selected frame contains at least one camera flashlight if the selected frame is not an abrupt frame or a slow change frame, an average luminance of the selected frame minus an average luminance of a temporally adjacent frame of the selected frame is equal to or exceeds a first threshold value, and a forward difference metric and a backward difference metric associated with the selected frame are both equal to or exceed a second threshold value; and
   adaptively encode the selected frame based on the shot event.

36. A processor for processing multimedia data, said processor comprising a configuration to
   obtain at least one metric indicative of a difference between a selected frame and frames temporally adjacent to the selected frame in a plurality of video frames, said at least one metric comprising bi-directional motion information and luminance difference information associated with the selected frame and the frames temporally adjacent to the selected frame;
   determine a shot event associated with the selected frame based on said at least one metric, wherein said processor comprises a further configuration to determine the shot event based on determining that the selected frame contains at least one camera flashlight if the selected frame is not an abrupt frame or a slow change frame, an average luminance of the selected frame minus an average luminance of a temporally adjacent frame of the selected frame is equal to or exceeds a first threshold value, and a forward difference metric and a backward difference metric associated with the selected frame are both equal to or exceed a second threshold value; and
   adaptively encode the selected frame based on the shot event.

* * * * *